(12) United States Patent
Makinen

(10) Patent No.: US 11,846,790 B2
(45) Date of Patent: Dec. 19, 2023

(54) OPTICAL METHOD AND SYSTEM FOR LIGHT FIELD DISPLAYS HAVING LIGHT-STEERING LAYERS AND PERIODIC OPTICAL LAYER

(71) Applicant: InterDigital Madison Patent Holdings, SAS, Paris (FR)

(72) Inventor: Jukka-Tapani Makinen, Oulu (FI)

(73) Assignee: InterDigital Madison Patent Holdings, SAS, Paris (FR)

(*) Notice: Subject to any disclaimer, the term of this patent is extended or adjusted under 35 U.S.C. 154(b) by 100 days.

(21) Appl. No.: 17/601,679

(22) PCT Filed: Apr. 8, 2020

(86) PCT No.: PCT/US2020/027274
§ 371 (c)(1),
(2) Date: Oct. 5, 2021

(87) PCT Pub. No.: WO2020/210361
PCT Pub. Date: Oct. 15, 2020

(65) Prior Publication Data
US 2022/0197052 A1 Jun. 23, 2022

Related U.S. Application Data

(60) Provisional application No. 62/833,427, filed on Apr. 12, 2019.

(51) Int. Cl.
*G02B 30/10* (2020.01)
*G02B 30/50* (2020.01)
(Continued)

(52) U.S. Cl.
CPC .......... *G02B 30/10* (2020.01); *G02B 3/0037* (2013.01); *G02B 3/0043* (2013.01); *G02B 30/26* (2020.01);
(Continued)

(58) Field of Classification Search
CPC .... G02B 3/0037; G02B 3/0043; G02B 30/10; G02B 30/26; G02B 30/27; G02B 30/29;
(Continued)

(56) References Cited

U.S. PATENT DOCUMENTS 6,369,954 B1 4/2002 Berge
6,975,455 B1 12/2005 Kotchick
(Continued)

FOREIGN PATENT DOCUMENTS

CA 2905147 9/2014
CN 1908734 A 2/2007
(Continued)

OTHER PUBLICATIONS

International Search Report and Written Opinion of the International Searching Authority for PCT/US2020/027274 dated Jul. 27, 2020, 12 pages.
(Continued)

*Primary Examiner* — Darlene M Ritchie
*Assistant Examiner* — Cory A Almeida
(74) *Attorney, Agent, or Firm* — Smadar Gefen

(57) ABSTRACT

A light-emitting layer of an apparatus includes an addressable array of light-emitting elements including a first light-emitting element and a periodic optical layer overlaying the light-emitting layer. The periodic optical layer includes at least a first periodic optical feature having a first optical power and a second periodic optical feature having a different optical power. A first controllable light-steering layer is disposed between the light-emitting layer and the periodic optical layer. The first controllable light-steering layer is switchable between directing light from the first light-emitting element through the first periodic optical feature and directing light from the first light-emitting element through the second periodic optical feature.

18 Claims, 19 Drawing Sheets

(51) Int. Cl.
*G02B 30/27* (2020.01)
*G02F 1/29* (2006.01)
*G09G 3/00* (2006.01)
*G02B 3/00* (2006.01)
*G02B 30/29* (2020.01)
*G02B 30/33* (2020.01)
*G02B 30/26* (2020.01)

(52) U.S. Cl.
CPC ............ *G02B 30/27* (2020.01); *G02B 30/29* (2020.01); *G02B 30/33* (2020.01); *G02B 30/50* (2020.01); *G02F 1/29* (2013.01); *G09G 3/001* (2013.01); *G02F 2203/24* (2013.01)

(58) Field of Classification Search
CPC ........... G02B 30/33; G02B 30/50; G02F 1/29; G02F 2203/24; G09G 3/001
See application file for complete search history.

(56) References Cited

U.S. PATENT DOCUMENTS

| | | | |
|---|---|---|---|
| 7,146,070 B1 * | 12/2006 | Li | G02F 1/1326 385/129 |
| 7,408,601 B1 | 8/2008 | Huang | |
| 7,518,149 B2 | 4/2009 | Maaskant | |
| 7,994,527 B2 | 8/2011 | Denbaars | |
| 9,664,914 B2 | 5/2017 | Gu | |
| 9,709,829 B2 | 7/2017 | Mcgrew | |
| 9,709,851 B2 | 7/2017 | Seo | |
| 2006/0244918 A1 * | 11/2006 | Cossairt | G02B 30/25 353/7 |
| 2007/0139779 A1 * | 6/2007 | Smith | G02F 1/292 359/569 |
| 2010/0157026 A1 | 6/2010 | Reichelt | |
| 2015/0228226 A1 | 8/2015 | Luebke | |
| 2017/0045764 A1 | 2/2017 | Gere | |
| 2017/0276864 A1 | 9/2017 | Large | |
| 2018/0024628 A1 | 1/2018 | Kim | |

FOREIGN PATENT DOCUMENTS

| | | |
|---|---|---|
| CN | 101384966 A | 3/2009 |
| CN | 105009583 A | 10/2015 |
| CN | 107257937 A | 10/2017 |
| EP | 3225025 B1 | 11/2020 |
| JP | 2005122020 A | 5/2005 |
| KR | 20160120199 A | 10/2016 |
| WO | 2008142156 | 11/2008 |
| WO | 2011014743 | 2/2011 |
| WO | 2012025786 | 3/2012 |
| WO | 2016135434 | 9/2016 |
| WO | 2018178336 A1 | 10/2018 |
| WO | 2018200417 A1 | 11/2018 |
| WO | 2020046716 A1 | 3/2020 |

OTHER PUBLICATIONS

Zhang, Xiangyu, et al., "A Novel Spatio-Temporal Multiplexing Multi-View 3D Display." Conference on Lasers and Electro-Optics, Pacific Rim, Optical Society of America, Jul. 31, 2017.

International Preliminary Report on Patentability for PCT/US2020/027274, dated Sep. 28, 2021 (8 pages).

Lee, Vincent W., et al. "Micro-LED Technologies and Applications". Information Display, vol. 6, No. 16, (2016), pp. 16-23.

Templier, François, et al. "A Novel Process for Fabricating High-Resolution and Very Small Pixel-pitch GaN LED Microdisplays". SID Symposium Digest of Technical Papers, vol. 48, No. 1, (2017), pp. 268-271 (4 pages).

Mcmanamon, Paul F., et al. "A review of phased array steering for narrow-band electrooptical systems." Proceedings of the IEEE, vol. 97, No. 6, 2009, pp. 1078-1096 (19 pages).

Smith, Neil R., et al. "Agile wide-angle beam steering with electrowetting microprisms". Optics Express, vol. 14, No. 14, pp. 6557-6563, Jul. 10, 2006 (7 pages).

Kim, Junoh, et al. "Electro-wetting lenticular lens with improved diopter for 2D and 3D conversion using lensshaped ETPTA chamber". Optics Express, vol. 26, No. 15, pp. 19614-19626, Jul. 23, 2018 (13 pages).

Wang, Hongjuan, et al. "Large-aperture transparent beam steering screen based on LCMPA". Applied Optics, vol. 55, No. 28, pp. 7824-7829, Oct. 1, 2016 (7 pages).

Shang, Xiaobing, et al. "Fast switching cholesteric liquid crystal optical beam deflector with polarization independence". Scientific Reports, vol. 7, No. 1, 2017 (8 pages).

Huang, Yi-Pai, et al. "Autostereoscopic 3D Display with Scanning Multi-electrode Driven Liquid Crystal (MeD-LC) Lens". 3D Research, vol. 1, No. 1, pp. 39-42, 2010 (4 pages).

Xia, Xinxing, et al. "Time-multiplexed multi-view three-dimensional display with projector array and steering screen". Optics Express, vol. 26, No. 12, pp. 15528-15538, Jun. 11, 2018 (11 pages).

Mishra, Kartikeya, et al. "Recent Developments in Optofluidic Lens Technology". Micromachines, vol. 7, 102, 2016 (24 pages).

Love, Gordon D., et al., "High-Speed Switchable Lens Enables the Development of a Volumetric Stereoscopic Display". Optics Express, vol. 17, No. 18, Aug. 31, 2009, pp. 15716-15725.

Matsuda, Nathan, et al. "Focal surface displays." ACM Transactions on Graphics (TOG), 2017, vol. 36, No. 4, pp. 1-14 (14 pages).

* cited by examiner

OPTICAL METHOD AND SYSTEM FOR LIGHT FIELD DISPLAYS HAVING LIGHT-STEERING LAYERS AND PERIODIC OPTICAL LAYER

CROSS-REFERENCE TO RELATED APPLICATIONS

The present application is a national stage application under 35 U.S.C. § 371 of International Application No. PCT/US20/27274, titled "OPTICAL METHOD AND SYSTEM FOR LIGHT FIELD DISPLAYS HAVING LIGHT-STEERING LAYERS AND PERIODIC OPTICAL LAYER" filed on Apr. 8, 2020, which is a non-provisional filing of, and claims benefit under 35 U.S.C. § 119(e) from, U.S. Provisional Patent Application Ser. No. 62/833,427 titled "OPTICAL METHOD AND SYSTEM FOR LIGHT FIELD DISPLAYS BASED ON LIGHT STEERING ELEMENTS AND PERIODIC OPTICAL LAYER" and filed Apr. 12, 2019, which application is hereby incorporated by reference in its entirety.

BACKGROUND

Different 3D displays, also referred to as display devices, can be classified on the basis of their form factors into different categories. Head-mounted devices (HMD) occupy less space than goggleless solutions, which also means that HMDs can be made with smaller components and less materials making them relatively low cost. Because head mounted Virtual Reality (VR) goggles and smart glasses are single-user devices, they do not allow shared experiences as naturally as goggleless solutions. Volumetric 3D displays take up space in all three spatial directions and generally call for a lot of physical material, making these systems heavy, expensive to manufacture, and difficult to transport. Due to the large size, the volumetric displays also tend to have small windows and limited field-of view (FOV). Screen-based 3D displays typically have one large but flat component, which is the screen, and a system that projects the image(s) over free space from a distance. Screen-based 3D display systems can be more compact for transportation and also cover much larger FOVs than, for example, volumetric displays. These systems can be complex and expensive because they require projector sub-assemblies and accurate alignment between the different parts, making them best for professional use. Flat form-factor 3D displays may require a lot of space in two spatial directions, but because the third direction is only virtual, flat form-factor 3D displays are relatively easy to transport to and assemble in different environments. Because these devices are flat, at least some of their optical components are more likely to be manufactured in sheet or roll format, making these devices relatively low cost in large volumes.

The human mind perceives and determines depths of observed objects in part by receiving signals from muscles used to orient each eye. The brain associates the relative angular orientations of the eyes with the determined depths of focus. Correct focus cues give rise to a natural blur on objects outside of an observed focal plane and a natural dynamic parallax effect. One type of 3D display capable of providing correct focus cues uses volumetric display techniques that can produce 3D images in true 3D space. Each voxel of a 3D image is located physically at the spatial position where the voxel is supposed to be displayed and reflects or emits light from that position toward the observers to form a real image in the eyes of viewers. The main problems with 3D volumetric displays are their low resolution, large physical size, and expensive manufacturing costs. These issues make 3D volumetric displays too cumbersome to use outside of special situations, e.g., product displays, museums, shows, and so forth. Another type of 3D display capable of providing correct retinal focus cues is a holographic display. Holographic displays reconstruct whole light wavefronts scattered from objects in natural settings. The main problem with this technology is a lack of suitable Spatial Light Modulator (SLM) component that could be used in the creation of the extremely detailed wavefronts.

A further type of 3D display technology capable of providing natural retinal focus cues is called the Light Field (LF) display. LF display systems are designed to create light fields that represent light rays travelling in space in all directions. LF systems aim to control light emissions both in spatial and angular domains, unlike the conventional stereoscopic 3D displays that basically only control the spatial domain with higher pixel densities. At least two fundamentally different ways to create light fields are utilized by many light field displays. In one approach, parallax is created across each individual eye of the viewer to produce the correct retinal blur corresponding to the 3D location of the object being viewed. This parallax can be performed by presenting multiple views per single eye. The second approach is a multi-focal-plane approach, in which an object's image is projected to an appropriate focal plane corresponding to its 3D location.

In current relatively low-density multi-view imaging displays, the views change in a coarse stepwise fashion as the viewer moves in front of the device. This movement lowers the quality of 3D experience and can cause a complete breakdown of 3D perception. In order to mitigate this problem and VAC, some Super Multi View (SMV) techniques have been implemented with as many as 512 views. The idea is to generate an extremely large number of views to make any transition between two viewpoints very smooth. If the light from at least two images from slightly different viewpoints enters the eye pupil simultaneously, a much more realistic visual experience follows. In this situation, motion parallax effects resemble the natural conditions better as the brain unconsciously predicts the image change due to motion. The SMV condition can be met by reducing the interval between two views at the correct viewing distance to a smaller value than the size of the eye pupil. The maximum angular density that can be achieved with SMV displays is limited by diffraction, and an inverse relationship between spatial resolution (pixel size) and angular resolution exists. Diffraction increases the angular spread of a light beam passing through an aperture and this effect may be considered in the design of very high density SMV displays.

SUMMARY

A light-emitting layer of an apparatus includes an addressable array of light-emitting elements including a first light-emitting element and a periodic optical layer overlaying the light-emitting layer. The periodic optical layer includes at least a first periodic optical feature having a first optical power and a second periodic optical feature having a different optical power. A first controllable light-steering layer is disposed between the light-emitting layer and the periodic optical layer. The first controllable light-steering layer is switchable between directing light from the first light-emitting element through the first periodic optical feature and directing light from the first light-emitting element through the second periodic optical feature.

The first periodic optical feature and the second periodic optical feature may be included in a first optical region. The periodic optical layer may comprise a repeating pattern of optical regions arranged similarly to the first optical region. A converging lens layer may be disposed between the light-emitting layer and the periodic optical layer. The converging lens layer may comprise a two-dimensional array of converging lenses, and wherein each converging lens is associated with at least one of the light-emitting elements in a projector cell. Each projector cell may include a corresponding optical region of the periodic optical layer. Different sections of the first light-steering layer may be associated with different projector cells and may be separately controllable. The first periodic optical feature may be operative to focus light from at least the first light-emitting element at a first distance from the periodic optical layer, and the second periodic optical feature may be operative to focus light from at least the first light-emitting element at a second distance from the periodic optical layer, wherein the second distance is different from the first distance. The first controllable light-steering layer may comprise at least one liquid crystal light-steering layer. The light-emitting layer may further comprise a second light-emitting element. The periodic optical layer may further comprise a third periodic optical feature having a first tilt direction and a fourth periodic optical feature having a second tilt direction different from the first tilt direction. The first controllable light-steering layer may be switchable between directing light from the second light-emitting element through the third periodic optical feature and directing light from the second light-emitting element through the fourth periodic optical feature. The apparatus may further comprise a second controllable light-steering layer between the light-emitting layer and the periodic optical layer. The first light-steering layer may be configured to deflect light in a first plane, and the second light-steering layer may be configured to deflect light in a second plane substantially perpendicular to the first plane. The first light-steering layer and the second light-steering layer may each be configured to deflect light in a first plane.

A method comprises displaying an image comprising a plurality of voxels including a first voxel at a first voxel position by selectively emitting first light by a first light-emitting element of a light-emitting layer comprising a plurality of light-emitting elements and operating a first section of a controllable light-steering layer to selectively direct light toward a first periodic optical feature of a periodic optical layer comprising a plurality of periodic optical features, wherein the first periodic optical feature focuses the first light onto the first voxel position.

The method may further comprise selectively emitting second light by a second light-emitting element of the light-emitting layer and operating at least a second section of the controllable light-steering layer to selectively direct the second light toward a second periodic optical feature of the periodic optical layer, wherein the second periodic optical feature focuses the second light onto the first voxel position. The first light and the second light may be emitted simultaneously or synchronously or alternatively at different times in a time-multiplexed manner. The method may further comprise, for at least a second voxel in the image having a second voxel position, selectively emitting third light by at least a third light-emitting element of the light-emitting layer and operating at least a third section of the controllable light-steering layer to selectively direct light toward a third periodic optical feature of the periodic optical layer, wherein the third periodic optical feature focuses the third light onto the second voxel position. The first voxel position may have a first depth and the second voxel position may have a second depth different from the first depth. The light emitted by one of the plurality of light-emitting elements may be steered toward one of the plurality of periodic optical features based on depth information of the image.

EXAMPLE NETWORKS FOR IMPLEMENTATION OF THE EMBODIMENTS

Figure 1A:
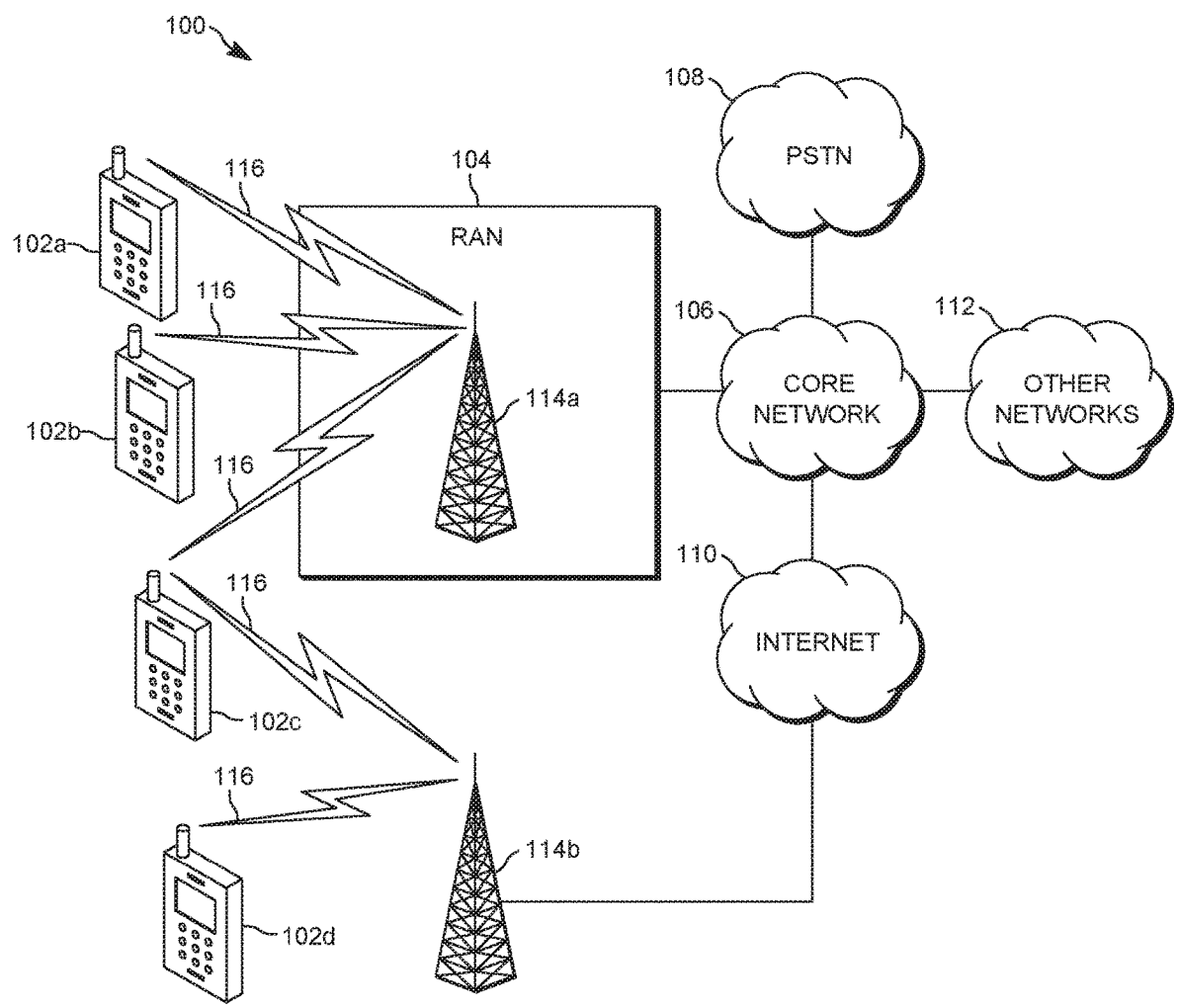
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, and so forth, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112. The disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA," may be configured to transmit and/or receive wireless signals and may include user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable device, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and so forth. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. In one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, and so forth). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by the WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b has a direct connection to the Internet 110. Thus, the base station 114b may not be required to access the Internet 110 via the CN 106/115.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
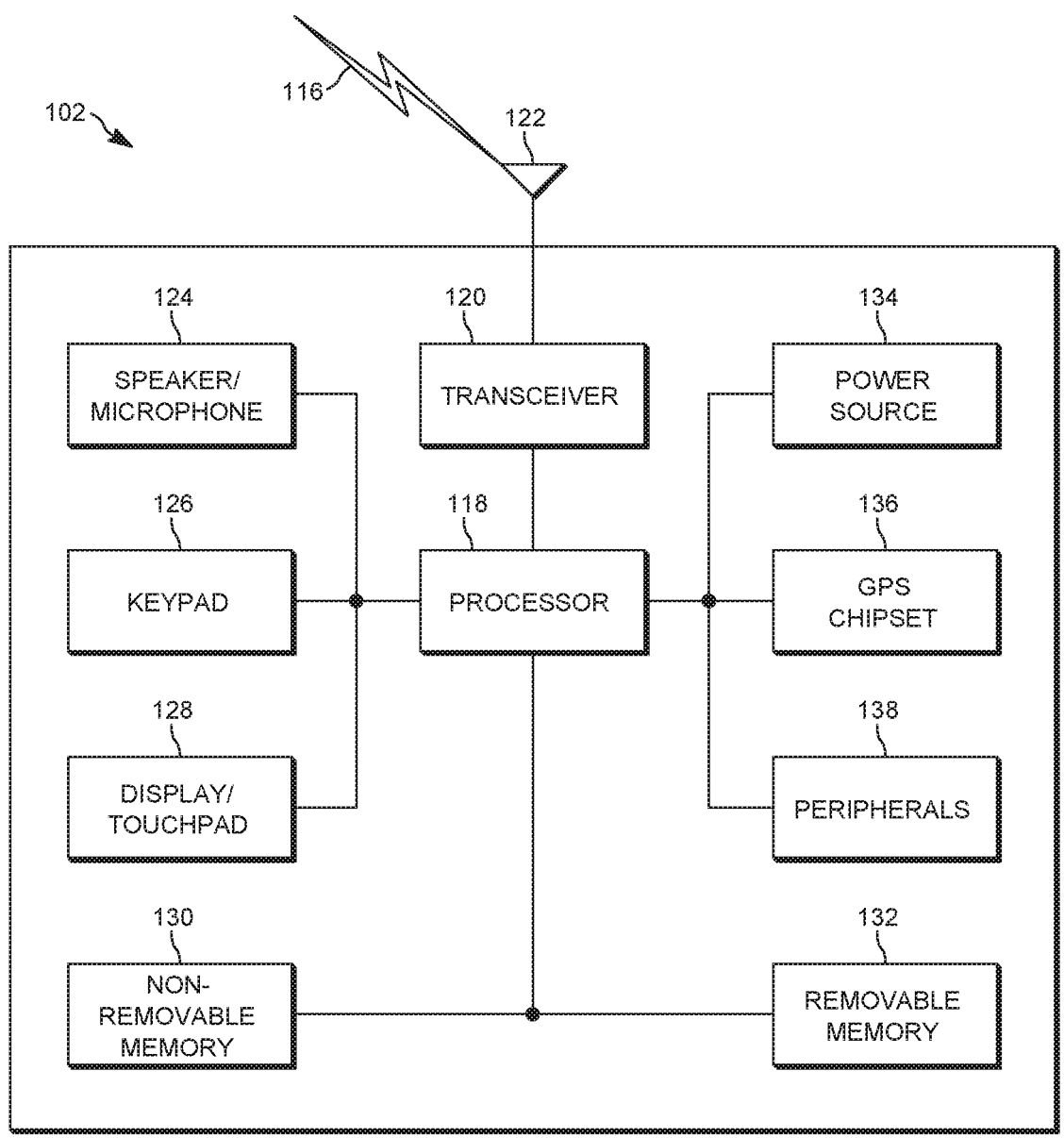
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. The WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. The transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and so forth), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102, for example, one or more of the WTRUs 102a, 102b, 102c, 102d, may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
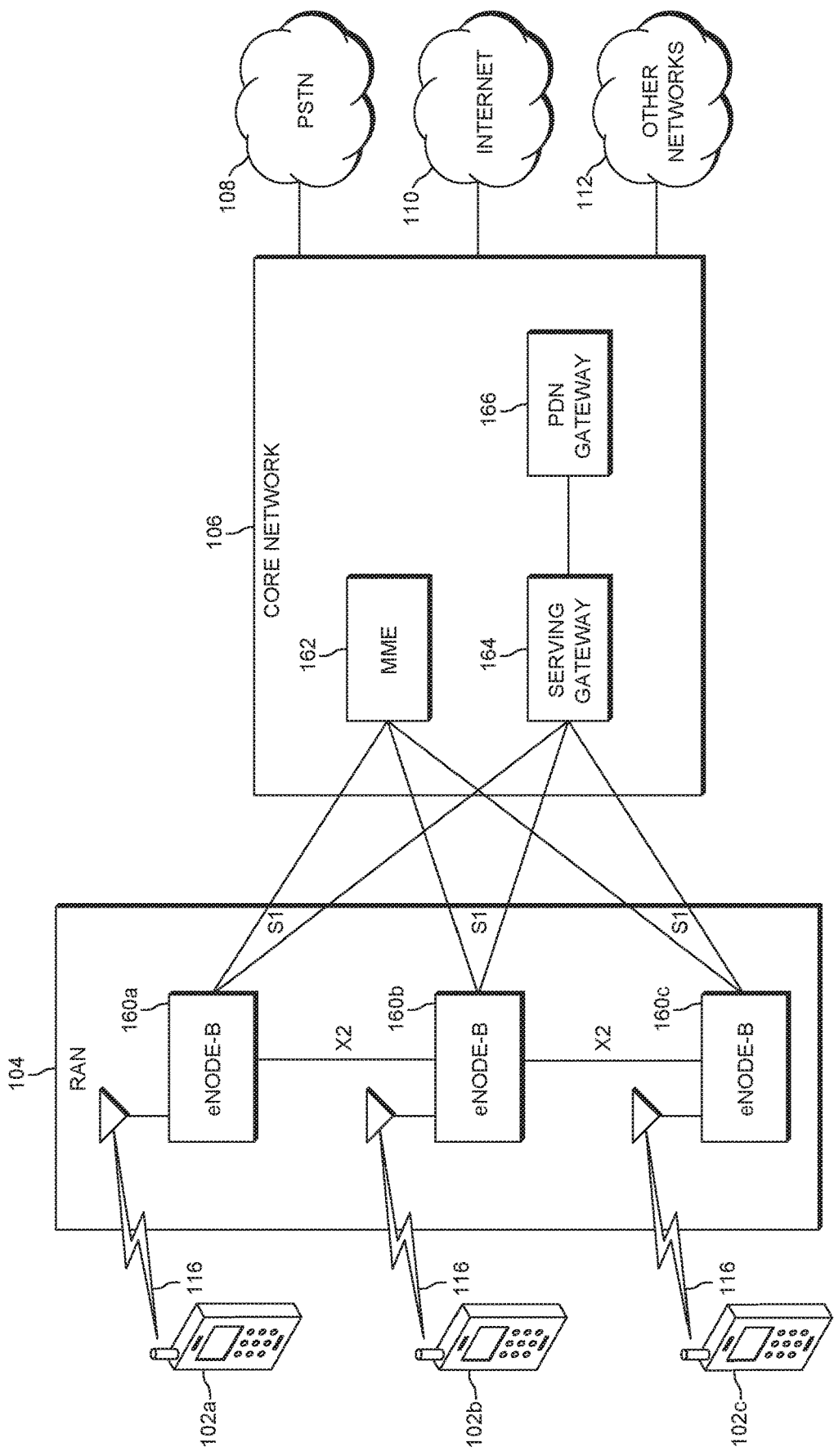
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, although the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. The eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of these elements are depicted as part of the CN 106, any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1C as a wireless terminal, in some embodiments, such a terminal may use (e.g., temporarily or permanently) wired communication interfaces with the communication network.

In some embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In one or more embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In one or more embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to one embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

One or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Systems and methods are described for providing a 3D display, such as a light-field display. In some embodiments, an optical method and construction of an optical system generates high-resolution 3D LF images with crossing light beams. Light is emitted from a layer containing individually addressable sources or pixels, for example, a µLED matrix or an OLED display. A converging lens structure, for example, a polycarbonate lenticular sheet, overlays the emitters. The converging lens structure focuses the light into a set of beams. Separate light-steering layers or elements may be used to tilt the beams towards specific locations on a periodic optical layer. In some embodiments, non-mechanical beam steering components, for example, hybrid structures including liquid crystal materials and polymer microprism sheets based on polarization switching or electrowetting microprisms, may be used. Periodic layer features may be configured to change the focus distance of each beam and may be utilized to create a series of fixed focal planes. The periodic layer may be manufactured, for example, as a polycarbonate sheet with optical shapes made from UV-curable material or a thin sheet with embossed diffractive structures. In some embodiments, spatial multiplexing in the LF display system may be provided by using projector cells containing multiple light sources. Temporal multiplexing may be provided by using light-steering layers for switching between different projected focal distances.

In some embodiments, the optical system may use crossing beams to form voxels. In some embodiments, voxels may be formed at discrete distances from the surface of the display. Voxels may be formed, for example, in front of, behind, and/or on the display surface. Emitted beams may focus to different distances from the optical structure and image the sources in different sized areas depending on the distance. Single beams may be used for generating the correct retinal focus cues for single eyes. Multiple beams crossing at the correct voxel distance may be used to generate the full voxel for two eyes and for inducing the correct eye convergence angles. The retinal focus cues and convergence angles may be created separately. This configuration may overcome vergence-accommodation conflict (VAC). The source matrix, focusing lenses, light-steering layers, and periodic layer may be configured to form a system capable of generating several virtual focal surfaces into the 3D space around the display.

In some embodiments, an optical method is based on the use of one or more light-steering layers or elements and periodic focusing layer. Light is emitted from separately controllable small emitters. An optical layer may be used to collimate or converge the light into beams. In some embodiments, the optical layer includes microlenses. A combination of light-steering layers and a periodic layer of optical features may be used for focusing beams to multiple focal layers. Two or more crossing beams may be used for initiating eye convergence. This configuration may form voxels without contradicting focus cues.

Some embodiments provide the ability to create a display, such as a light field (LF) display, that is capable of presenting multiple focal planes of a 3D image while overcoming the vergence-accommodation conflict (VAC) problem. Some embodiments provide the ability to create a display, such as a light field display with thin optics, without the need for moving parts. In some embodiments, the non-mechanical beam steering layers may be produced using liquid crystal technology.

In some embodiments, a method includes altering the focal depth of a light projection using beam steering optical elements and a periodic or repeating focusing layer.

Some embodiments provide a display capable of producing images at multiple focal planes with the use of a periodic optical structure without the need for a spatial light modulating layer in front of the optics. Some such embodiments may reduce complexity of the optical hardware and/or electronics. Such embodiments may allow for better optical efficiency and energy savings than, for example, configurations utilizing a spatial light modulator that acts as an adaptive mask and attenuates a significant amount of light.

Figure 2:
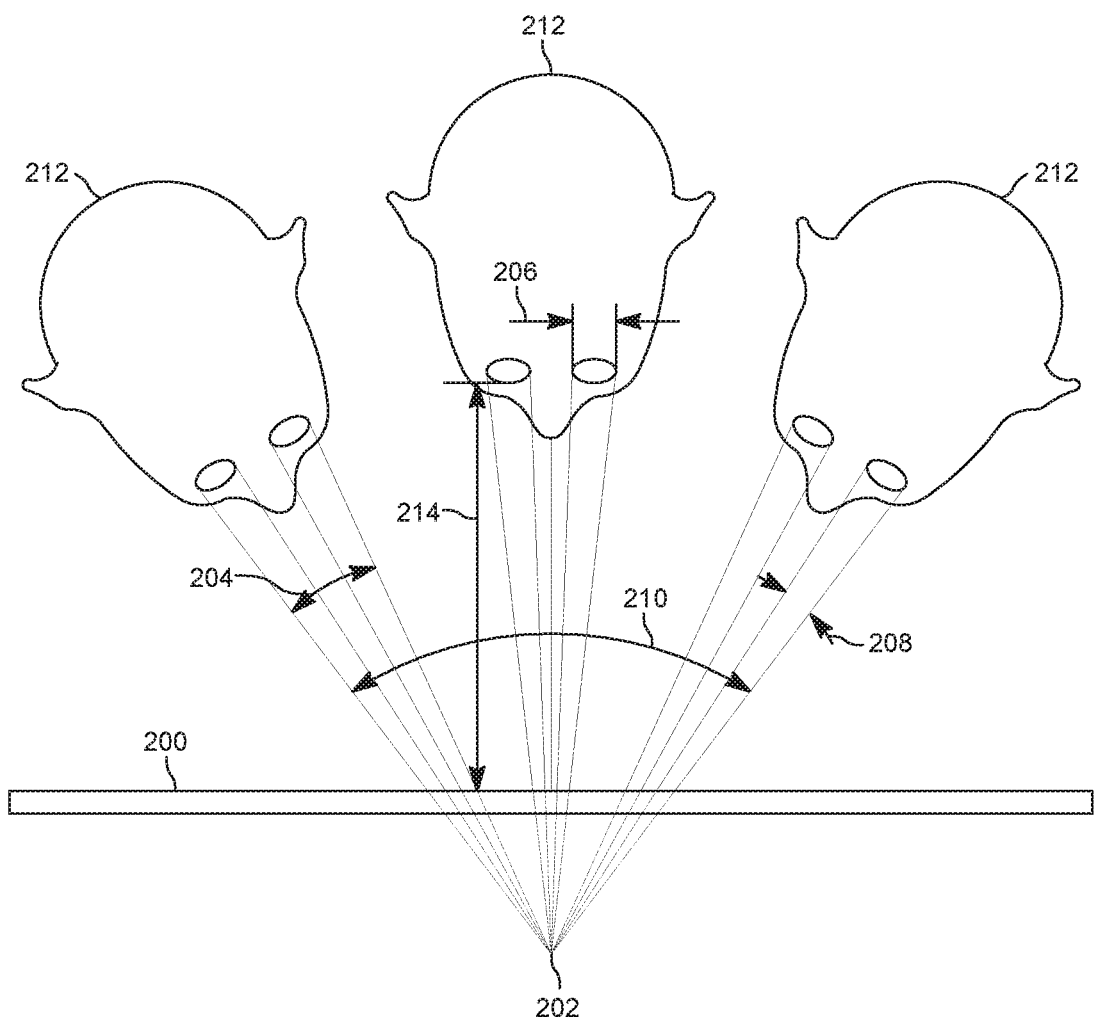
FIG. 2 depicts light emission angles of a light field (LF) display.

FIG. 2 depicts various light emission angles directed towards respective viewers or users. For example, FIG. 2 shows a view of the geometry of light emission angles from a LF display 200 for a virtual object point 202. The display/touchpad 128 may comprise the LF display 200. The LF display 200 in FIG. 2 produces the desired retinal focus cues and multiple views of 3D content in a single flat form-factor panel. A single 3D display 200 projects at least two different views to the two eyes of a single user 212 in order to create a coarse 3D perception effect. The brain uses these two different eye images to determine 3D distance. Logically this is based on triangulation and interpupillary distance. To provide this effect, at least two views are projected into a single-user viewing angle (SVA) 204, as shown in FIG. 2. In at least one embodiment, the LF display 200 projects at least two different views toward a single eye pupil in order to provide correct retinal focus cues. For optical design purposes, an eye-box may be characterized around the viewer eye pupil when determining the volume of space within which a viewable image is formed. See, for example, the eye-box width 206 shown in FIG. 2. In some embodiments of the LF display 200, at least two partially overlapping views are projected inside an Eye-Box Angle (EBA) 208 covered by the eye-box at a known viewing distance 214. In some embodiments, the LF display 200 is viewed by multiple viewers 212 looking at the display from different viewing angles. In such embodiments, several different views of the same 3D content are projected to viewers 212 covering a whole intended Multiuser Viewing Angle (MVA) 210.

FIG. 2 illustrates that an LF display 200 may advantageously cover three different angular ranges simultaneously: one range for covering the pupil of a single eye, one range for covering the two eyes of a single user, and one range for multiple viewers 212. Of these three angular ranges, the latter two may be resolved, for example, by using several light-emitting pixels under a lenticular or parallax barrier structure or by using several projectors with a common screen. Such techniques may be suitable for the creation of relatively large light emission angles utilized in the creation of multiple views. Addressing the range covering the eye pupil in order to produce the correct retinal focus cues and overcome vergence-accommodation conflict (VAC) may produce more advantageous results.

VAC is one issue with current stereoscopic 3D displays. A flat form-factor LF 3D display may address this issue by producing both the correct eye convergence and correct focus angles simultaneously. In current consumer displays, an image point lies on a surface of a display, and only one illuminated pixel visible to both eyes is needed to represent the point correctly. Both eyes are focused and converged to the same point. In the case of parallax-barrier 3D displays, two clusters of pixels are illuminated to represent the single point correctly. In addition, the direction of the light rays from these two spatially separated pixel clusters are controlled in such a way that the emitted light is visible only to the correct eye, thus enabling the eyes to converge to the same single virtual point.

Figure 3A:
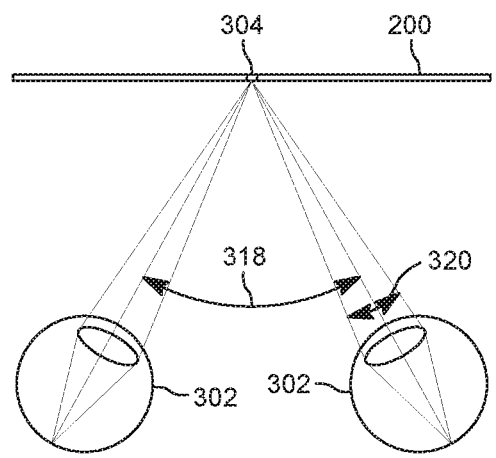
FIG. 3A depicts a pair of eyes and the focus angle (FA) and convergence angle (CA) produced by an LF display for a voxel formed at an LF display surface.
Figure 3B:
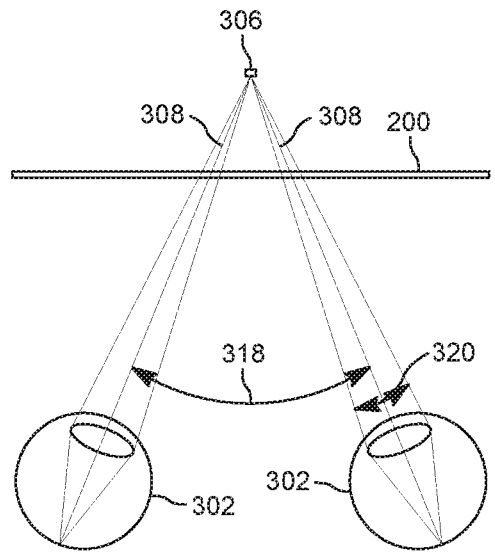
FIG. 3B depicts a pair of eyes and the FA and CA produced by an LF display for a voxel formed behind an LF display surface.
Figure 3C:
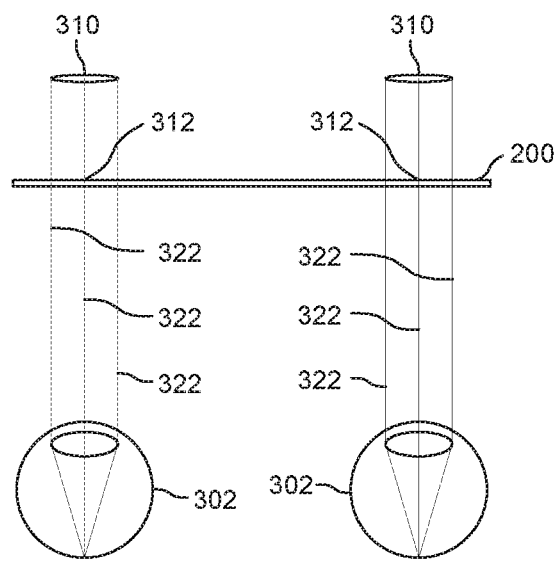
FIG. 3C depicts a pair of eyes and the FA and CA produced by an LF display for a voxel formed at an infinite distance behind the LF display surface.
Figure 3D:
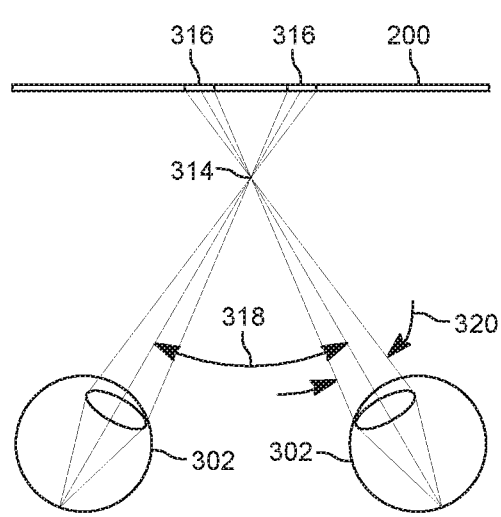
FIG. 3D depicts a pair of eyes and the FA and CA produced by an LF display for a voxel formed in front of an LF display surface.

A flat form-factor high-quality LF 3D display able to produce both the eye convergence (CA) angles 318 and retinal focus (FA) angles 320 simultaneously may provide a more desirable effect. FIG. 3A through FIG. 3D show these angles 318, 320 in four different 3D image content cases. In the first case illustrated in FIG. 3A, the single image point 304 is on the surface of the LF display 200 and only one illuminated display pixel visible to both eyes 302 is needed. Both eyes are focused and converged on the same point 304. In the second case as illustrated in FIG. 3B, where the virtual image point (voxel) 306 is behind the LF display 200 and two clusters of pixels 308 are illuminated. In addition, the direction of the light rays from these two display pixel clusters 308 are controlled in such a way that the emitted light is visible only to the correct eye, thus enabling the eyes to converge to the same single virtual point 306. In the third case as illustrated in FIG. 3C, the virtual image converges effectively at an infinite distance 310 behind the screen and only parallel light rays or beams 322 are emitted from the display surface from two pixel clusters 312. In the last case as illustrated in FIG. 3D, the image point or voxel 314 is in front of the display, two pixels clusters 316 are activated, and the emitted beams cross at the same point 314 where they focus. In the last three presented generalized cases, both spatial and angular control of emitted light is used by the LF display 200 in order to create both the convergence angles 318 and focus angles 320 for natural eye responses to the 3D image content.

A flat-panel-type multi-view LF display 200 may implement spatial multiplexing alone. A row or matrix of light-emitting pixels (LF sub-pixels) may be located behind a lenticular lens sheet or microlens array, and each pixel may be projected to a unique view direction or to a limited set of view directions in front of the display structure. As more pixels are present on the light-emitting layer behind each light beam collimating or converging feature, the more views can be generated. A trade-off may be found between the number of unique views generated and spatial resolution. If a smaller LF pixel size is desired from the 3D display, the size of individual sub-pixels may be reduced; or alternatively, a smaller number of viewing directions may be generated. Sub-pixel sizes may be limited to relatively large areas due to lack of suitable components. A high-quality LF display 200 having both high spatial and angular resolutions is desirable. High angular resolution is desirable in fulfilling the SMV condition.

In order to produce 3D LF images at different focal planes with sufficient resolution by utilizing crossing beams, each beam is advantageously well-collimated or converged with a narrow diameter. In some embodiments, the level of collimation or convergence is related to the position of the focal plane being displayed. For example, beams may be substantially collimated or converged but slightly diverging for display of focal planes behind the display, and beams may be substantially collimated but slightly converging for display of focal planes in front of the display.

The beam waist may advantageously be positioned at the same area where the beams cross to avoid contradicting focus cues for the eye. If the beam diameter is large, the voxel formed in the beam crossing is imaged to the eye retina as a large spot or area. A large divergence value (for an intermediate image between the display and viewer) results in the beam becoming wider as the distance between the voxel and the eye gets smaller. With smaller distances, the eye resolves images in higher detail. The spatial resolution of the virtual focal plane becomes worse, however, with smaller distances. Voxels positioned behind the display surface are formed with virtual extensions of the emitted beams, and wider beams may be acceptable because the eye's resolution also becomes worse at longer distances. In order to have high resolution both in front of and behind the display surface, separate beams with adjustable focuses may be utilized. Without adjustable focus, the beams have a single fixed focus that sets the smallest achievable voxel size. Because the eye resolution is lower at larger distances, the virtual extensions of the beams may be allowed to widen behind the display and the beam focus may be set to the closest specified viewing distance of the 3D image. In some embodiments, the focal surface resolutions may also be balanced throughout the volume, where the image is formed by combining several neighboring beams in an attempt to make the voxel sizes uniform.

Figure 4A:
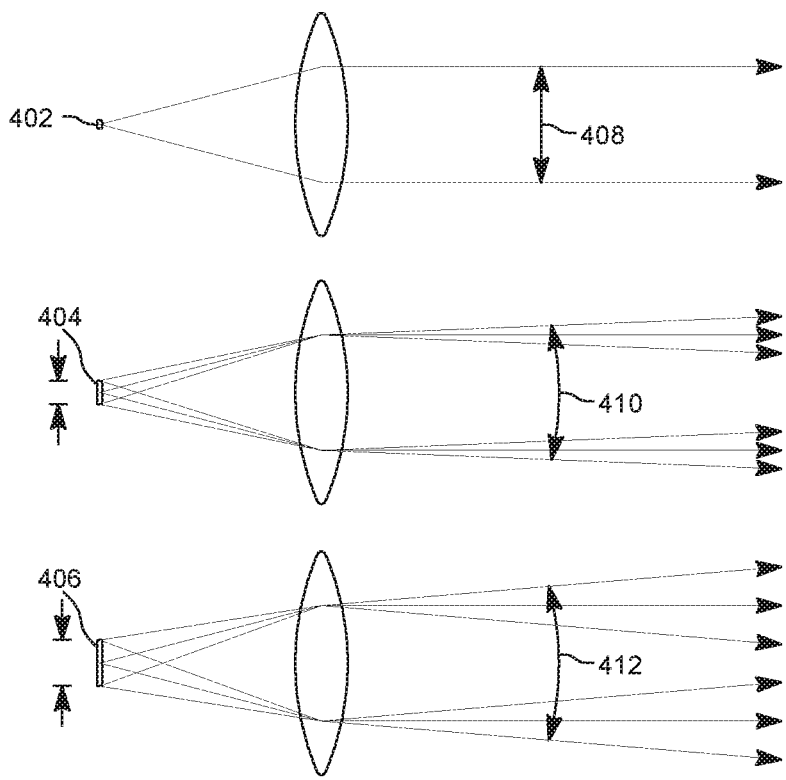
FIG. 4A illustrates beam divergence caused by geometric factors of a lens.

In the case of an ideal lens, the achievable light beam collimation is dependent on two geometrical factors: size of the light source and focal length of the lens. Perfect collimation 408 without any beam divergence can only be achieved in the theoretical case in which a single-color point source (PS) 402 is located exactly at focal length distance from an ideal positive lens, such as shown at the top of FIG. 4A. Unfortunately, real-life light sources have a finite surface area from which the light is emitted, making them extended sources (ES) 404. As each point of the source is separately imaged by the lens, the total beam ends up as a group of collimated or converged sub-beams that propagate along somewhat different directions after or beyond the lens. As presented in FIG. 4A, a smaller extended source 404 has a smaller total beam divergence 410, whereas a larger extended source 406 has a larger total beam divergence 412, thus total beam divergence increases with the size of the extended source. This geometrical factor cannot be avoided with any optical means and is the dominating characteristic causing beam divergence with relatively large light sources.

Figure 4B:
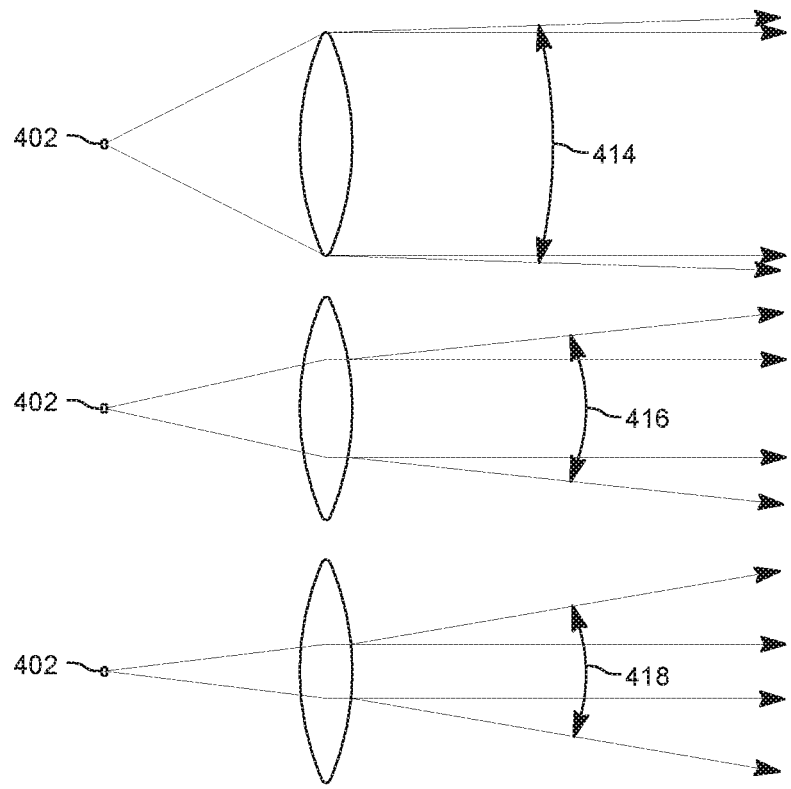
FIG. 4B illustrates beam divergence caused by diffraction.

Another, non-geometrical, feature causing beam divergence is diffraction. Diffraction includes various phenomena that occur when a wave of light encounters an obstacle or a slit. It can be described as the bending of light around the corners of an aperture into the area of geometrical shadow. Diffraction effects can be found in all imaging systems and cannot be removed even with a perfect lens design that is able to balance out all optical aberrations. A lens that is able to reach the highest optical quality is often called diffraction limited because most of the blurring remaining in the image comes from diffraction. The angular resolution achievable with a diffraction limited lens can be calculated from the formula $\sin \theta = 1.22 * \lambda/D$, where $\lambda$ is the wavelength of light and D the diameter of the entrance pupil of the lens. Thus, the color of light and lens aperture size have an influence on the amount of diffraction. FIG. 4B shows a representation of how the beam divergence is increased when the lens aperture size is reduced. This effect can be formulated into a general principle in imaging optics design: if the design is diffraction limited, the way to improve resolution is to make the aperture larger. Diffraction is the dominating feature causing beam divergence with relatively small light sources.

Figure 5:
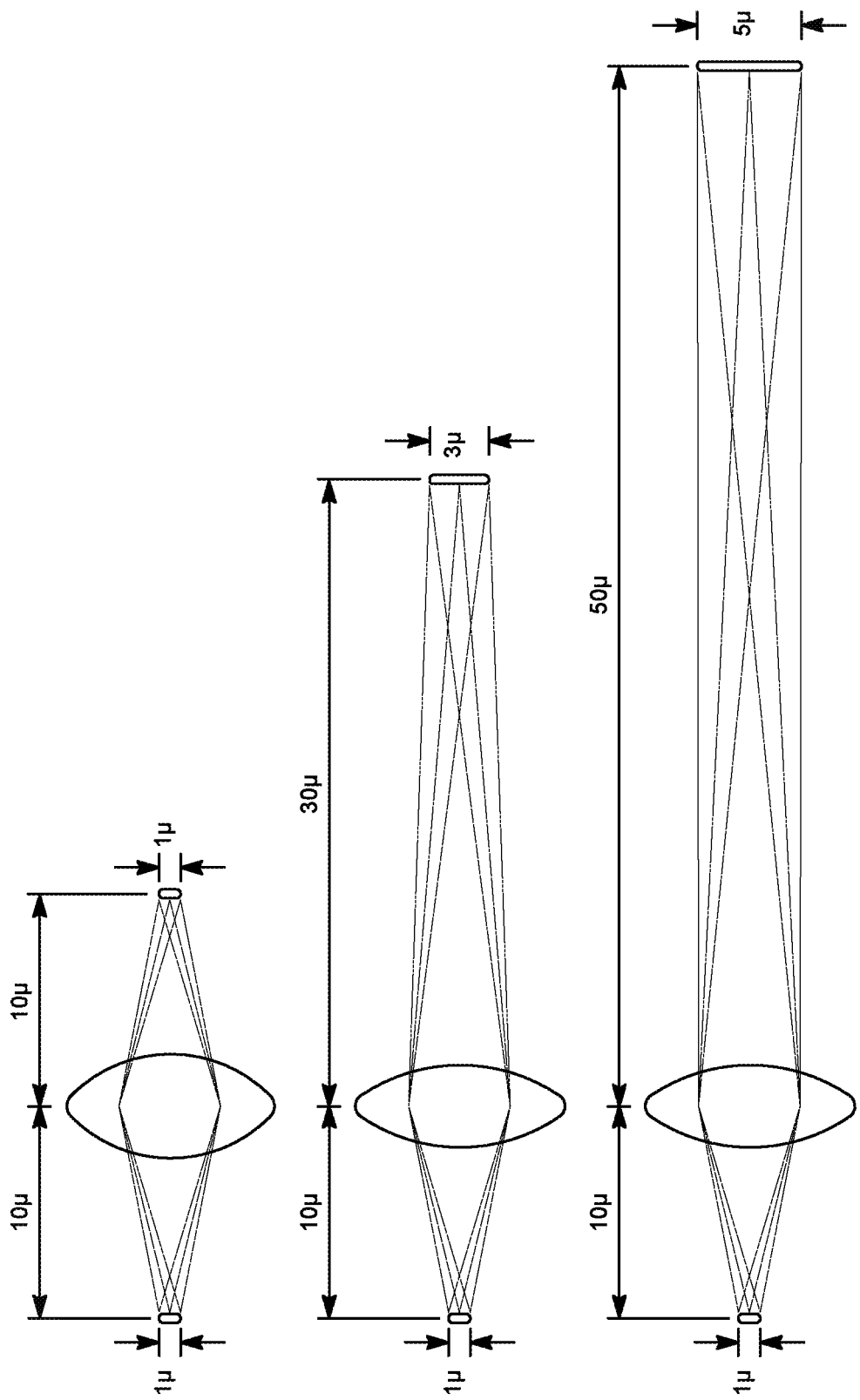
FIG. 5 illustrates the image magnification for three lenses of different optical powers.

As shown in FIG. 4A, the size of an extended source has a big effect on the achievable beam divergence. The source geometry or spatial distribution is mapped to the angular distribution of the beam as can be seen in the resulting far field pattern of the source-lens system. If the collimating or converging lens is positioned at a focal distance from the source, the source is imaged to a relatively large distance from the lens, and the size of the image can be determined from the system magnification ratio. In the case of a simple imaging lens, this ratio can be calculated by dividing the distance between lens and image by the distance between source and lens as illustrated in FIG. 5. If the distance between source and lens is fixed, different image distances can be achieved by changing the optical power of the lens with the lens curvature. As the image distance becomes larger in comparison to the lens focal length, the required changes in lens optical power become smaller, approaching the situation where the lens effectively collimates or converges the emitted light into a beam that has the spatial distribution of the source mapped into the angular distribution, and the source image is formed without focusing.

In flat form factor goggleless LF displays, the LF pixel projection lenses may have very small focal lengths in order to achieve the flat structure and in order to allow the beams from a single LF pixel to be projected to a relatively large viewing distance. Thus, the sources may be effectively imaged with high magnification when the beams of light propagate to the viewer. For example, if the source size is 50 μm×50 μm, projection lens focal length is 1 mm, and viewing distance is 1 m, the resulting magnification ratio is 1000:1, and the source geometric image is 50 mm×50 mm in size. As a result, the single light emitter can be seen only with one eye inside this 50 mm diameter eye-box. If the source has a diameter of 100 μm, the resulting image would be 100 mm wide and the same pixel could be visible to both eyes simultaneously, because the average distance between eye pupils is only 64 mm. A stereoscopic 3D image would not be formed because both eyes would see the same image(s). The example calculation shows how the geometrical parameters such as light source size, lens focal length, and viewing distance are related to each other.

As the beams of light are projected from the LF display pixels, divergence causes the beams to expand. This divergence applies not only to the actual beam emitted from the display towards the viewer, but also to the virtual beam that appears to be emitted behind the display, converging to the single virtual focal point close to the display surface. In the case of a multi-view display, this divergence may be useful because the divergence expands the size of the eye-box. Providing a beam size that does not exceed the distance between the two eyes may be utilized to break the stereoscopic effect. When creating a voxel in a virtual focal plane with two or more crossing beams anywhere outside the display surface, the spatial resolution achievable with the beams reduces as the divergence increases. If the beam size at the viewing distance is larger than the size of the eye pupil, the pupil becomes the limiting aperture of the optical system.

Figure 6A:
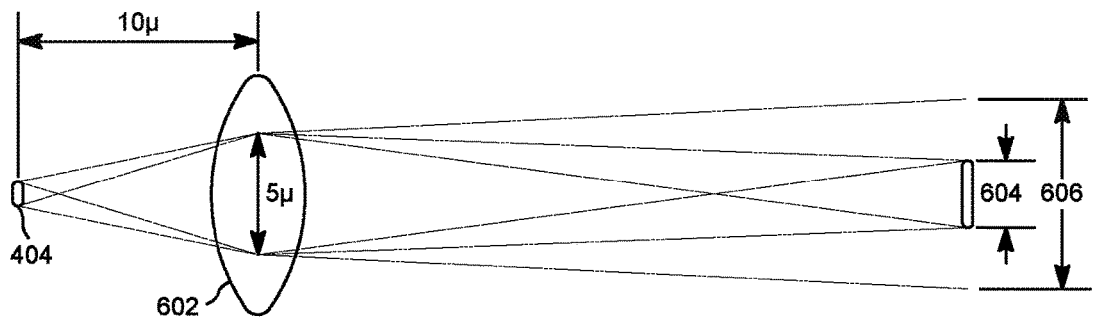
FIG. 6A illustrates the combined effects of geometric factors and diffraction for one extended source and a small lens aperture.
Figure 6B:
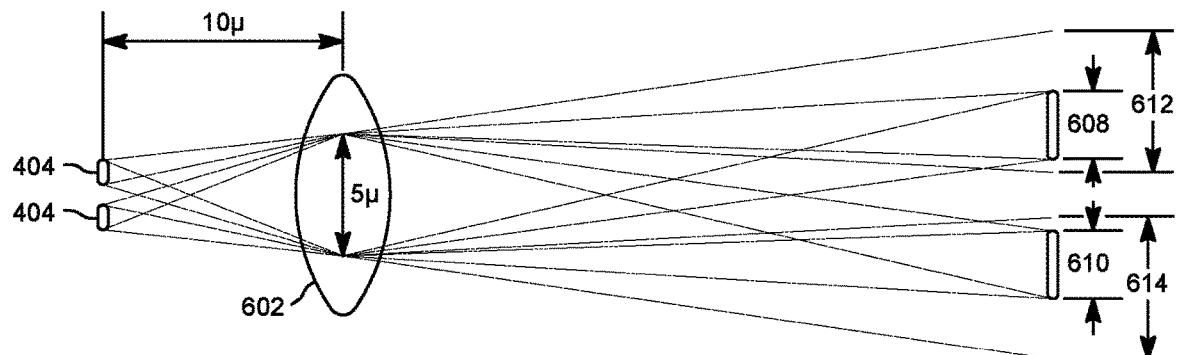
FIG. 6B illustrates the combined effects of geometric factors and diffraction for two sources and a small lens aperture.
Figure 6C:
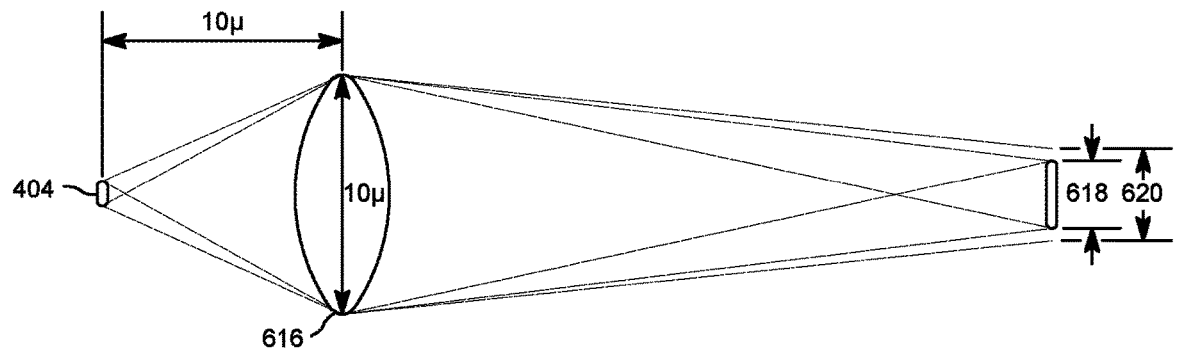
FIG. 6C illustrates the combined effects of geometric factors and diffraction for one source and a large lens aperture.
Figure 6D:
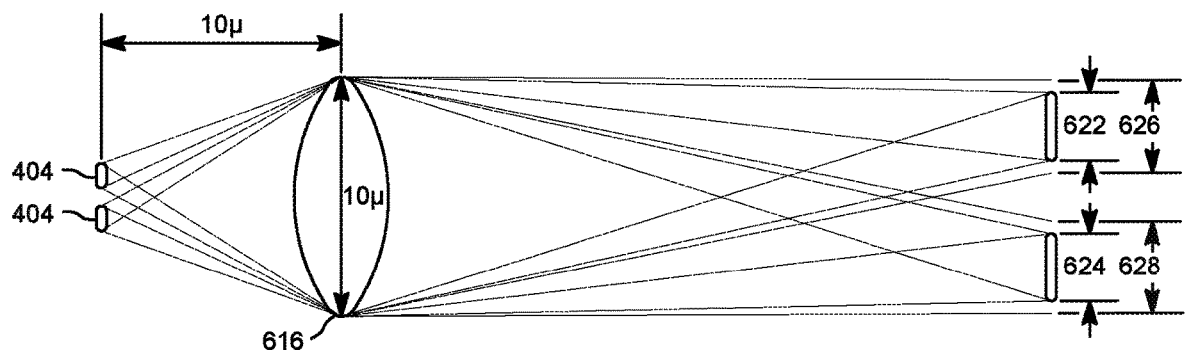
FIG. 6D illustrates the combined effects of geometric factors and diffraction for two sources and large lens aperture.

Geometric and diffraction effects are utilized in the LF display's design in order to achieve an optimal solution for voxel resolution. With very small light sources, optical system measurements become closer to the wavelength of light and diffraction effects become more significant. FIG. 6A through FIG. 6D illustrate examples of how the geometric and diffraction effects work together in situations where one and two extended sources are imaged to a fixed distance with a fixed magnification. FIG. 6A depicts a lens 602 where the lens aperture size is relatively small, 5 μm, and the Geometric Image (GI) 604 is surrounded by blur that comes from diffraction, making the Diffracted Image (DI) 606 much larger. FIG. 6B shows two extended sources 404 placed side-by-side and imaged with the same small aperture, 5 μm, lens. Even though the GIs 608, 610 of both sources 404 are clearly separated, the two source images cannot be resolved because the diffracted images 612, 614 overlap. In practice, reducing light source size would not improve the achievable voxel resolution because the resulting source image size would be the same whether two separate light sources or one larger source that covers the area of both separate emitters is used. To resolve the two source images as separate pixels/voxels, increasing the aperture size of the imaging lens may be advantageous. FIG. 6C shows the same focal length lens 616, but with a larger aperture, 5 μm, used in imaging the extended source 404. In this situation, the diffraction is reduced, and the DI 620 is only slightly larger than the GI 618, which has not changed e because magnification is fixed. In FIG. 6D, the two GIs 622, 624 can now be resolved because the Dis 626, 628 are no longer overlapping. In this configuration, use of two different sources improves the spatial resolution of the voxel grid.

Optical Design Features of LF Displays Based on Crossing Beams

Some embodiments provide the ability to create a display. In some embodiments, the display may be used as a light field display 200 that is capable of presenting multiple focal planes of a 3D image while addressing the vergence-accommodation conflict (VAC) problem.

In some embodiments, the LF display 200 projects emitter images towards both eyes of the viewer without light scattering media between the 3D display and the viewer. In order to create a stereoscopic image by creating a voxel located outside the display surface, the LF display 200 may be configured such that an emitter inside the display associated with that voxel is not visible to both eyes simultaneously. Accordingly, the field-of-view (FOV) of an emitted beam bundle may cover both eyes. The single beams may have FOVs that are narrower than the distance between two eye pupils (e.g., ~64 mm on average) at the viewing distance. The FOV of one display section as well as the FOVs of the single emitters may be affected by the widths of the emitter row/emitter and magnification of the imaging optics. A voxel created with a focusing beam may be visible to the eye only if the beam continues its propagation after the focal point and enters the eye pupil. The FOV of a voxel may advantageously cover both eyes simultaneously. If a voxel were visible to single eye only, the stereoscopic effect may not be formed, and a 3D image may not be seen. Because a single display emitter may be visible to only one eye at a time, increasing the voxel FOV by directing multiple crossing beams from more than one display emitter to the same voxel within the human persistence-of-vision (POV) time frame may be advantageous. In some embodiments, the total voxel FOV is the sum of individual emitter beam FOVs.

Figure 7:
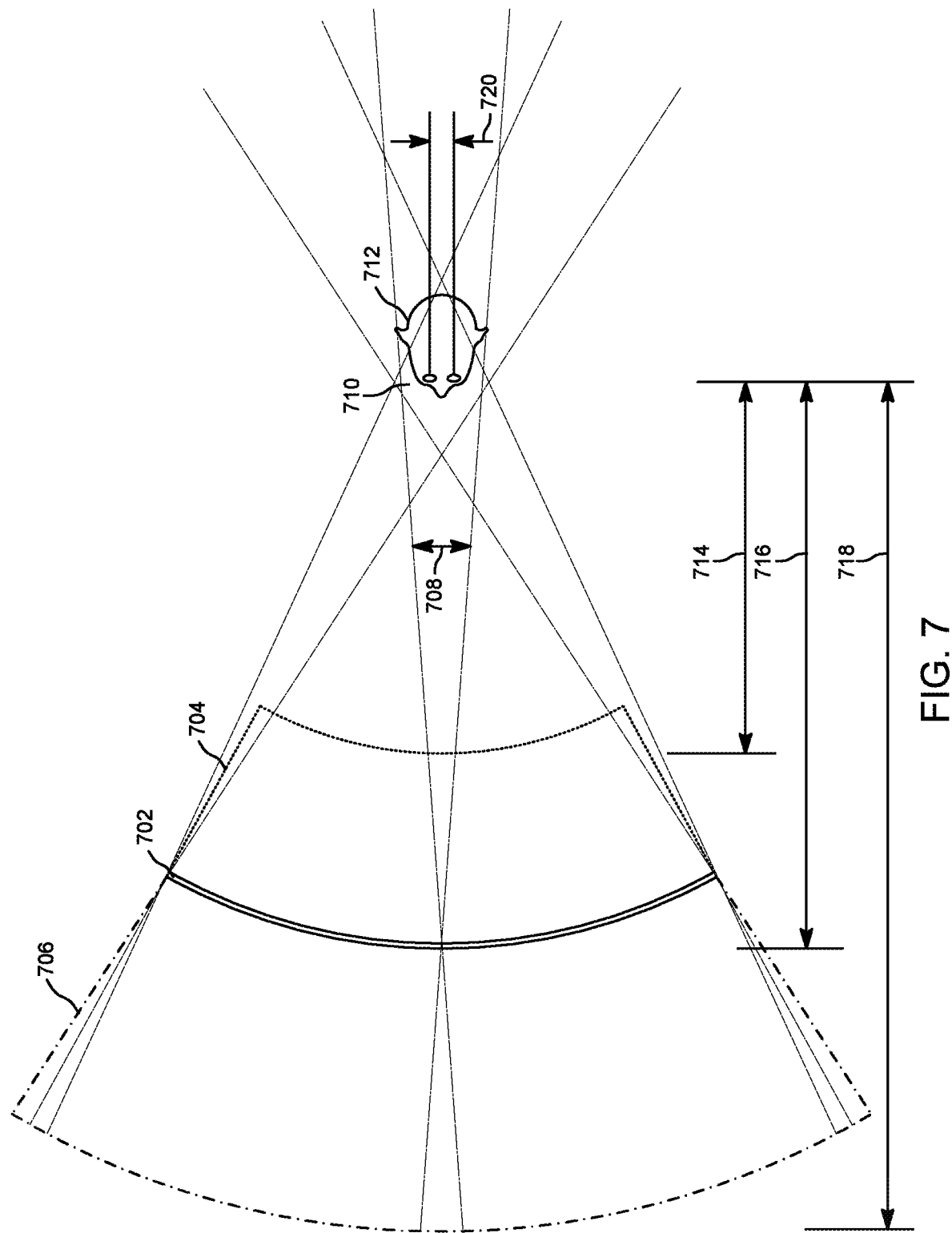
FIG. 7 illustrates an example viewing geometry of a 3D light field display, in accordance with some embodiments.

For local beam bundle FOVs to overlap at their associated specified viewing distances, some embodiments may include a curved display 702 with a fixed radius. In some embodiments, the projected beam directions may be directed towards a specific point, for example, using a flat Fresnel lens sheet. If the FOVs were not configured to overlap, some parts of the 3D image may not be formed. Due to the practical size limits of a display and practical limits for possible focal distances, an image zone may be formed in front of and/or behind the display corresponding to the region wherein the 3D image is visible. FIG. 7 is a representation of an example viewing geometry that may be achieved with a 3D LF display 702 using crossing beams. In front of the curved display 702, the edge of a 3D image zone 704 maybe the furthest focal distance from the display with reasonable spatial resolution. The image zone 704 may also be limited by the FOV 708 of the whole display 702. To get the maximum resolution at the minimum image distance 714, the optical features of the display 702 may be designed to focus the source images to the furthest edge of this image zone 704. In some embodiments, another image zone 706 behind the display may be formed by the virtual extensions of the emitted beams. In some embodiments, voxels behind the display 702 may have larger allowable sizes because the viewer is positioned further away and because eye resolution may be lower at greater distances. In some embodiments, a maximum image distance 718 may be selected based on a minimum acceptable resolution achievable with the beam virtual extensions.

Figure 8A:
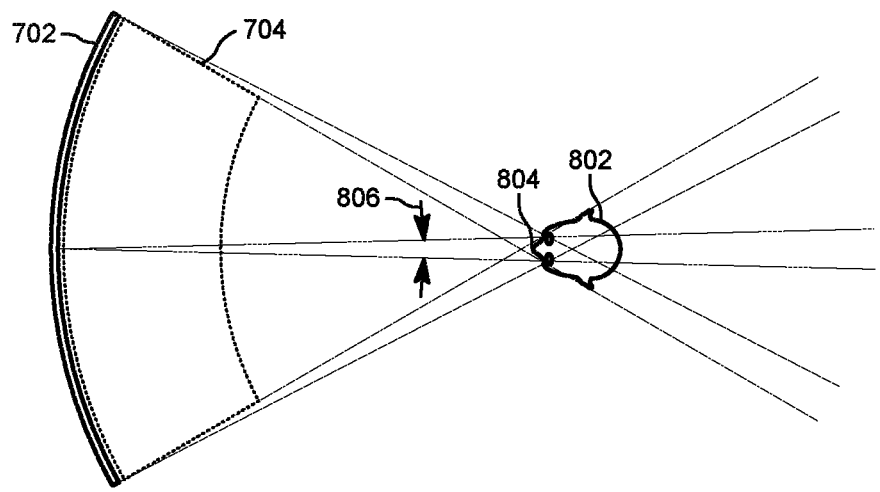
FIG. 8A depicts a first example viewing geometry of a 3D LF display, in accordance with some embodiments.
Figure 8B:
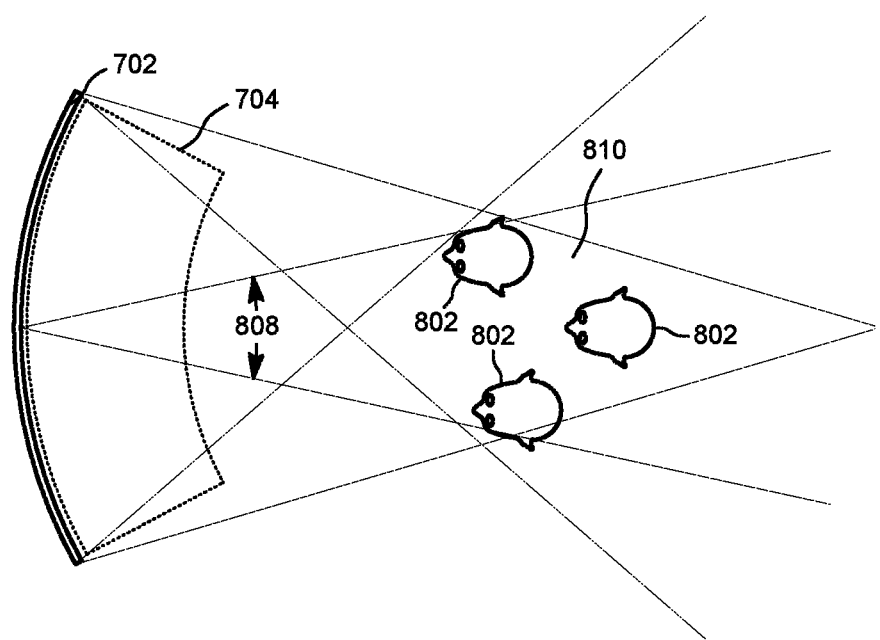
FIG. 8B depicts a second example viewing geometry of a 3D LF display, in accordance with some embodiments.

FIG. 7 depicts an example viewing geometry of a 3D light field display, in accordance with some embodiments. The surface of the display 702 depicted in FIG. 7 is curved with a radius that is the same as the designated viewing distance 716. In the example, the overlapping beam bundle FOVs form a viewing zone 710 around the facial area of the viewer 712. The size of this viewing zone 710 may affect the amount of movement allowed for the viewer's head. Both eye pupils positioned inside the zone simultaneously make the stereoscopic image possible. The size of the viewing zone may be selected by altering the beam bundle FOVs. FIG. 8A and FIG. 8B show a representation of two different example viewing geometry cases. As shown in FIG. 8A, a single viewer 802 is shown in front of a display 702 with the corresponding viewing geometry, wherein a small viewing zone 804 covers both eyes' pupils, which may be achieved using narrow beam bundle FOVs 806. A minimum functional width of the viewing zone 804 may be affected by the eye pupil distance. For example, an average pupil distance 720 may be ~64 mm, such as shown in FIG. 7. A small width may also imply a small tolerance for viewing distance changes as narrow FOVs tend to quickly separate from each other at increasing distances both in front of and behind the optimal viewing location. A viewing geometry with wider beam bundle FOVs 808 is shown in FIG. 8B. This viewing geometry may facilitate multiple viewers 802 inside the larger viewing zone 810 and/or at different viewing distances. In this example, positional tolerances may be large.

The viewing zone may be increased by increasing the FOV of each display beam bundle. For example, increasing the width of the light emitter row or by changing the focal length of the beam collimating or converging optics may increase the FOV. Smaller focal lengths may result in larger voxels, thus increasing the focal length may achieve better resolution. A trade-off may be found between the optical design parameters and the design needs. Accordingly, different use cases may balance between these factors differently.

Technological Status of μLED Sources in Display Applications

Some embodiments utilize μLEDs. μLEDs are LEDs that are manufactured with the same basic techniques and from the same materials as standard LEDs, but μLEDs are miniaturized versions of the commonly available components and can be made as small as 1 μm to 10 μm in size. One example of a dense matrix has 2 μm×2 μm chips assembled with 3 μm pitch. μLEDs have been used as backlight components in TVs. When compared to OLEDs, μLEDs are much more stable components and can reach very high light intensities.

A bare μLED chip may emit a specific color with spectral width of ~20-30 nm. A white source can be created by coating the chip with a layer of phosphor that converts the light emitted by blue or UV μLEDs into a wider white light emission spectrum. A full-color source can also be created by placing separate red, green, and blue μLED chips side-by-side because the combination of these three primary colors creates the sensation of a full color pixel when the separate color emissions are combined by the human visual system. The previously mentioned dense matrix facilitates the manufacturing of self-emitting full-color pixels that have a total width below 10 μm (3×3 μm pitch).

Light extraction efficiency from the semiconductor chip is one of the parameters that determine electricity-to-light efficiency of LED structures. Several methods aim to enhance the extraction efficiency and thus facilitate LED-based light sources to use the available electric energy as efficiently as feasible, which is useful with, for example, mobile devices that have a limited power supply. Some methods utilize a shaped plastic optical element that is integrated directly on top of an LED chip. Due to lower refractive index difference, integration of the plastic element extracts more light from the chip material in comparison to a chip surrounded by air. The plastic element also directs the light in a way that enhances light extraction from the plastic element and renders the emission pattern to be more directional. Other methods, such as the methods found in U.S. Pat. No. 7,518,149, shape the chip itself into a form that favors light emission angles that are more perpendicular towards the front facet of the semiconductor chip and the light more easily escape the high refractive index material. These structures also direct the light emitted from the chip. In the latter situation, the extraction efficiency was estimated to be twice as high when compared to regular μLEDs. Considerably more light was emitted by an emission cone of 30° in comparison to a standard chip Lambertian distribution where light is distributed evenly to the surrounding hemisphere.

Non-Mechanical Beam Steering Components in 3D Display Applications

In some embodiments, electrowetting cells may be implemented for non-mechanical beam steering. Electrowetting cells may be configured to form tunable microprisms that can be used to provide continuous scanning of beams through a relative large angular range (e.g. ±7°) with high switching speeds (~ms), for example, by using the techniques discussed in Neil R. Smith, Don C. Abeysinghe, Joseph W. Haus, and Jason Heikenfeld, "Agile wide-angle beam steering with electrowetting microprisms," *Optics Express* Vol. 14, Issue 14, pp. 6557-6563, (2006). Polarization independence provided by the electrowetting cell approach may be useful for achieving higher optical efficiencies for the components. Electrowetting cells may be implemented in some embodiments using techniques including, for example, the techniques found in Canadian Patent CA2905147 for switching between 2D and 3D display modes, and the techniques found in WO2008142156 for beam steering in a directional backlight system. In some embodiments, electrowetting may be implemented for forming lenticular structures of a multi-view display system, for example, by using the techniques described in J. Kim, D. Shin, J. Lee, G. Koo, C. Kim, J-H. Sim, G. Jung, Y-H. Won, "Electro-wetting lenticular lens with improved diopter for 2D and 3D conversion using lens-shaped ETPTA chamber," *Opt. Express* 26, No. 15, 19614-19626 (2018).

In some embodiments, components and systems based on utilization of liquid crystal (LC) materials are implemented for non-mechanical beam steering. As highly birefringent material, the LC layers have different refractive indices in two orthogonal directions. This property may be useful when implemented along with polymer microprisms, for example, by using the techniques as described in H. Wang, O. Yaroshchuk, X. Zhang, Z. Zhuang, P. Surman, X. Wei Sun, Y. Zheng, "Large-aperture transparent beam steering screen based on LCMPA," *Applied Optics* Vol. 55, Issue 28, (2016). As described in H. Wang, et all (2016), the polymer microprisms are used for switching between two beam steering states with a structure that contains two LC layers. A first, active LC layer, is sandwiched between, for example, two glass sheets containing electrodes. A second, passive layer, is formed between a glass or polymer substrate and a polymer microprism sheet. Switching is initiated with the active LC layer that twists incident beam linear polarization by 90° in the perpendicular direction to light propagation when voltage is applied. This twisting selects which of the refractive indices of the birefringent passive LC layer is used in the second part of the system. In a first state of the steering system, refractive index difference between passive LC layer and microprism polymer material is so small that no light bending occurs, whereas in a second state, the index difference causes light rays to bend to a predetermined angle at the interface. This angle is usually small (~1°), but can be increased, in some embodiments, by employing various techniques. For example, rays of light may be bent to larger angles by, e.g., adding holographic gratings after the LC layers, for example, by using the techniques described in P. McManamon, P. Bos, M. Escuti, J. Heikenfeld, S. Serati, H. Xie, E. Watson, "A Review of Phased Array Steering for Narrow-Band Electrooptical Systems," *Proceedings of the IEEE*, Vol 97, Issue 6, (2009). Another way the angle may be increased, in some embodiments, is by stacking several polarization-based beam steering components, reaching angles as large as, for example, ±15°, as described, for example, in WO2011014743.

Liquid crystal displays (LCDs) have been used for several decades by the display industry. After such a long history of research, LCD material properties and processing methods are very well known. One advantage of LC-based beam steering methods is that the components may be produced fairly easily with currently available manufacturing technology and equipment, making low-cost manufacture in large quantities possible. Needing no mechanical movement to initiate beam steering is also a factor in favor of using such technologies in 3D displays. Disadvantages of the use of linearly polarized light are lowered optical efficiency of the system and increased power consumption. Because current LCD displays are already polarization dependent systems, new steering components may be integrated more easily without high cost in efficiency. In addition, some embodiments may make use of cholesteric LCs, instead of the more common nematic phase crystals, which can be used for beam steering without polarization dependence. The use of cholesteric LCs may be implemented, for example, by using techniques such as discussed in Shang X, Meeus L, Cuypers D, De Smet H, "Fast switching cholesteric liquid crystal optical beam deflector with polarization independence," *Scientific Reports*, July 26, 7(1):6492, (2017). Such embodiments may increase the component transmittance for display panels comprising, for example, OLEDs or μLEDs.

LC components may be implemented in some embodiments as electrically switchable parallax barriers, for example, by using the techniques discussed in U.S. Pat. No. 9,664,914, wherein a black grating structure is implemented to block some display pixel view directions when the LC layer is activated. This configuration may produce different images that can be shown to both eyes of the viewer. Without the activated grating, the display may function as a normal 2D display. The LC layer may also be used in forming a lenticular lens structure on top of a dense pixel matrix by reorienting some of the LC material molecules with electric current by using, for example, the techniques discussed in U.S. Pat. No. 9,709,851. Such a configuration may utilize special electrode designs, but can also be used for switching between 2D and 3D modes because the LC lenses project the pixel images to different view directions. In the 3D mode, multiple views may be obtained with the cost of lower spatial resolution because only spatial multiplexing is used in creation of the multi-view image. Some embodiments may employ scanning the electrically formed lenticular LC lenses through the display surface, using techniques such as those discussed in Y-P. Huang, C-W. Chen, T-C. Shen, J-F. Huang, "Autostereoscopic 3D Display with Scanning Multi-Electrode Driven Liquid Crystal (MeD-LC) Lens," *3D Research*, Vol. 1, Issue 1, pp 39-42, (2010). Such embodiments may facilitate time multiplexing. For example, the pixels synchronized to the scanning action may be activated several times inside a single scan timeframe, creating several additional views. Some embodiments may employ hybrid systems, where beam steering LC element is used before or after a rigid polymer lenticular sheet structure. Examples of such hybrid systems are discussed in WO2012025786 and Xiangyu Zhang, Hongjuan Wang, Phil Surman, Yuanjin Zheng, "A Novel Spatio-temporal Multiplexing Multi-view 3D Display," *IEEE Conference on Lasers and Electro-Optics Pacific Rim (CLEO-PR)*, (2017). Such hybrid systems may facilitate the creation of additional angular view directions between the directions determined by pixel positions and lenticular optics. In some such embodiments, temporal multiplexing may be used along with spatial multiplexing in 3D multi-view displays. In some embodiments, LC-based beam steering screen components may be used in a similar manner with multiple projectors, for example by using the techniques discussed in X. Xia, X. Zhang, L. Zhang, P. Surman, and Y. Zheng, "Time-multiplexed Multi-view Three-dimensional Display with Projector Array and Steering Screen," *Optics Express* Vol. 26, Issue 12, pp. 15528-15538, (2018).

In addition to beam angular steering, both the electrowetting cells and LC based components with hybrid structures can be used for adjusting beam focus without mechanical movement. Examples of electrowetting cells that may be implemented in some embodiments include those discussed in U.S. Pat. No. 6,369,954 and in K. Mishra, H. van den Ende, F. Mugele, "Recent Developments in Optofluidic Lens Technology," *Micromachines* 7(6):102, (2016). Examples of hybrid structures that may be implemented in some embodiments are discussed in U.S. Pat. Nos. 7,408,601, 9,709,829, and WO2016135434.

In some embodiments, electronic focus adjustment may be utilized in head mounted devices, for example, wherein a stereoscopic 3D display virtual image can be moved to different focal distances from the eye, for example, by using the techniques discussed in G. Love, D. Hoffman, P. Hands, J. Gao, A. Kirby, and M. Banks, "High-speed switchable lens enables the development of a volumetric stereoscopic display," *Opt Express,* 17(18): 15716-15725, (2009). In this manner, images may be made to look more natural. In some embodiments, beam focus adjustment may be utilized in goggleless 3D displays, for example, by adjusting the position or shape of the projected image focal surface as described in N. Matsuda, A. Fix, D. Lanman, "Focal Surface Displays," *ACM Transactions on Graphics* 36(4):1-14, (2017). In embodiments described herein, focus adjustment may provide the ability to alter a whole projected image or to adjust the focus of multiple beams individually.

Example Optical Structure and Function

Figure 9:
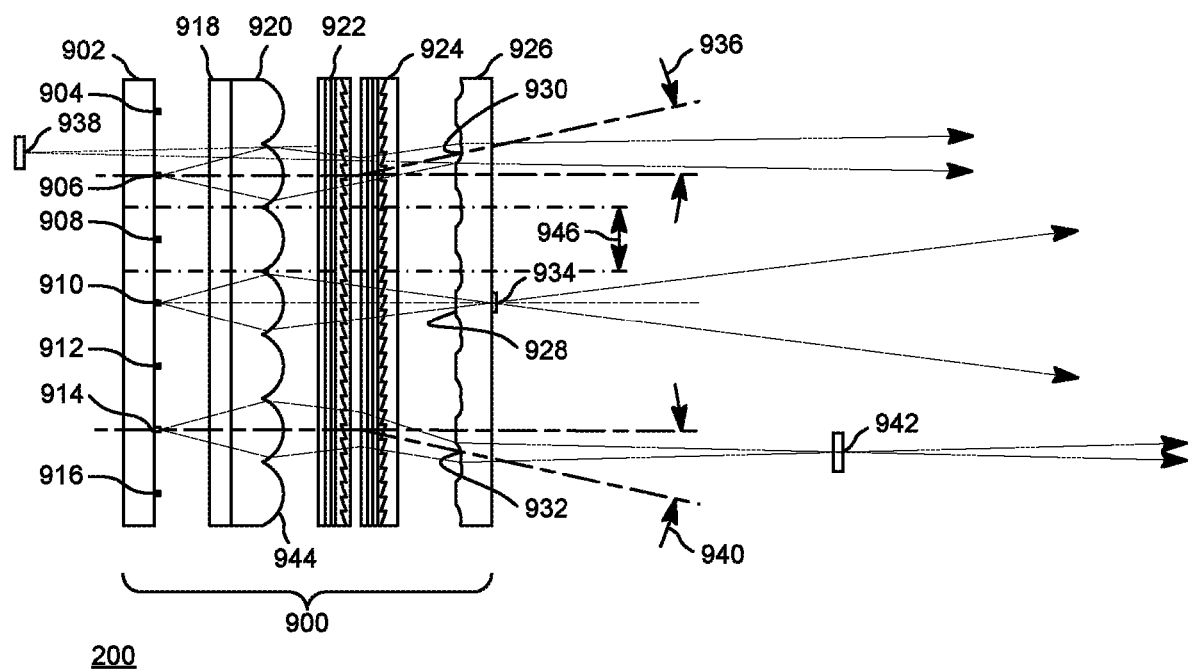
FIG. 9 depicts a 3D LF display structure and its functionality, in accordance with some embodiments.

Some embodiments provide an optical method and apparatus of an optical system that may be used for creating high-resolution 3D LF images with crossing beams. FIG. 9 depicts a light generation module 900 of a 3D LF display 200, in accordance with some embodiments. As shown in the example in FIG. 9, light is emitted from a light-emitting layer 902 with separately controllable light emitters 904, 906, 908, 910, 912, 914, 916, such as μLEDs. A converging lens structure or layer 920, for example, a polycarbonate microlens sheet, overlaying the emitters of the light-emitting layer 902 collects and focuses the light into a set of beams that are used to form an image in different viewing directions. The converging lens layer 920 may comprise an array of converging lenses 923. The array may be a two-dimensional array of lenses 944, and each converging lens 944 may be associated with at least one of the light-emitting elements 908 in a projector cell 946. Each emitter and its corresponding converging lens are components in a projector cell 946. Adjacent projector cells may be separated from each other with opaque baffle structures (not illustrated) that suppress crosstalk. If non-polarized light sources such as μLEDs or OLEDs are used, a polarizer 918 may be added to obtain linearly polarized beams. When an LCD panel source is utilized, polarizers may be integrated to the source component such that no additional polarizers 918 are needed.

FIG. 9 illustrates light-steering layers 922, 924 and a periodic optical layer 926 also referred to as a periodic layer 926. In some embodiments, the periodic layer 926 is continuous. The periodic layer 926 may overlay the light-steering layers 922, 924 and the light-emitting layer 902. The light or beam steering layers 922, 924 may tilt or alter the directions of light or beams coming from the light generation module 900. The one or more light-steering layers 922, 924 may be controllable as described below. These beams may be steered to specific locations or positions on the periodic layer 926. Periodic features 928, 930, 932 on one surface of the periodic layer 926 may change the focus distance of each beam in different ways, thereby generating a series of fixed focal planes where layers of a 3D image are formed with crossing beams. The periodic features 928, 930, 932 have at least one different optical property from one another, for example, refractive index, light scattering, and a surface property, such as shape or radius of curvature. In the example of FIG. 9, a first light source 910 positioned at the middle of the structure is focused to the front of the whole display structure though a flat feature 928 on the periodic layer and through the steering layers 922, 924 that are not activated. The first light source 910 is imaged to a focal point 934 directly on the display surface. Another light source 906, above the first light source 910, generates another focused beam that is tilted at an angle 936 by the light-steering layers 922, 924 toward another feature 930 of the periodic layer 926. This feature 930 has negative optical power that extends the beam focal distance in such a way that the beam appears to be emitted from a focal point 938 behind the display 200. A third emitter 914, below the first light source 910, generates a beam that is tilted at another angle 940. This beam is focused on a second type of negative optical power feature 932 on the periodic layer 926, causing the beam to focus at a focal point 942 in front of the display 200. One or more of the focus-changing optical features 930, 932 on the periodic layer 926 may be configured to have additional tilts with respect to the beam optical axis in order to compensate for the beam directional changes in the light-steering layers 922, 924. In this manner, different focal distance beams may be projected from a single source towards the viewer. The light-steering layers 922, 924 may therefore be used to switch between different projected focal distances, thereby adding temporal multiplexing to the LF display system.

Figure 10A:
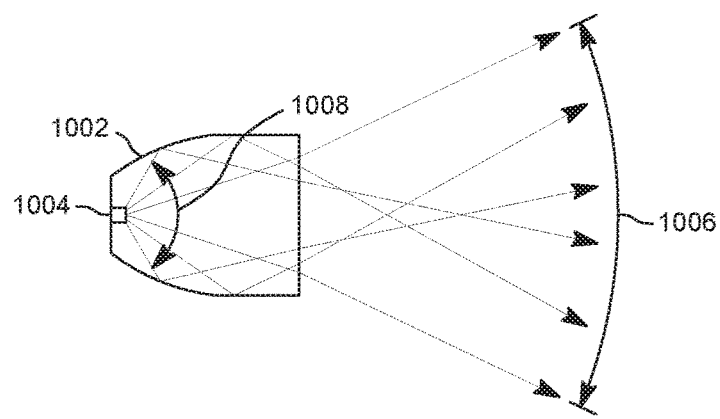
FIG. 10A depicts a light concentrator used for changing the source NA, in accordance with some embodiments.
Figure 10B:
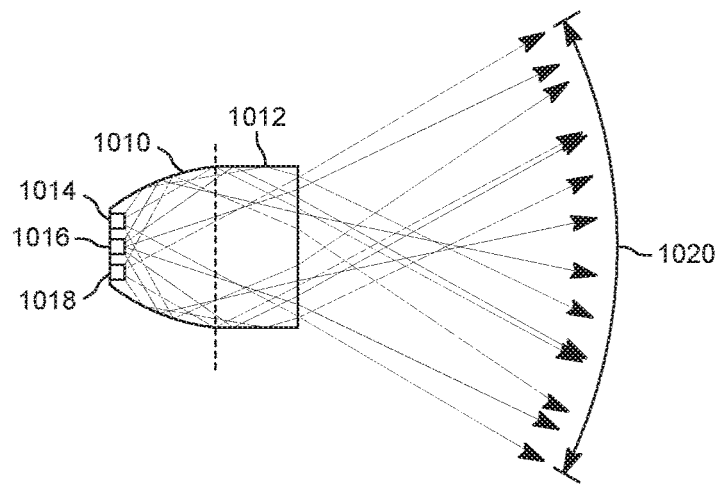
FIG. 10B depicts a light concentrator used for mixing colors of three LEDs, in accordance with some embodiments.
Figure 10C:
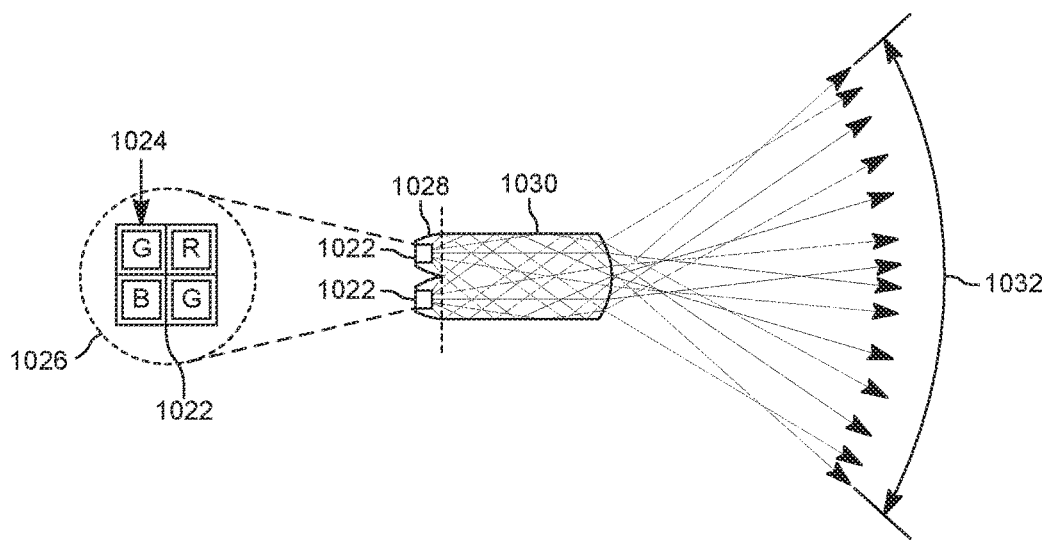
FIG. 10C depicts a light concentrator used for mixing colors of four LEDs with a smaller aperture structure, in accordance with some embodiments.

In some embodiments, source components in the light-emitting layer may include μLEDs provided with molded light concentrator structures, such as polymer light concentrator structures, as described herein. In some embodiments, a concentrator 1002 collects light emitted from a source 1004 to a large numerical aperture (NA) 1006 and concentrates the light to a smaller NA 1008. FIG. 10A depicts a light concentrator 1002 that changes the source NA, in accordance with some embodiments. In the example of FIG. 10A, NA 1008 is smaller than NA 1006. In some embodiments, light concentrators mix colors, for example, when separate red 1014, green 1016, and blue 1018 components are utilized. FIG. 10B depicts a light concentrator 1010 with a mixer 1012 that mixes colors of three LEDs 1014, 1016, 1018, in accordance with some embodiments. In these types of concentrators, one part 1010 of the structure may provide light concentration and another part 1012 provides spatial mixing of the different colored light, resulting in a mixed RGB output 1020. Spatial mixing may be useful in LF systems where the spatial position of the source causes an angular direction. Without mixing, color separation in the voxels may result. As angular spread decreases in the concentrator, the size of the optical aperture increases. Increased optical aperture may have a negative effect on LF systems using spatial multiplexing where smaller pixel sizes are desired. FIG. 10C depicts a light concentrator used for mixing colors of four LEDs, such as an LED cluster, 1022 with a smaller aperture structure 1024, in accordance with some embodiments. In the example of FIG. 10C, the sources 1022 are grouped into a square pattern as shown in the side view 1026 and over molded into a joint concentrator 1028 and mixer 1030 that outputs mixed RGB light 1032. In this example, the front or input surface of the light concentrator is curved to improve the NA concentration. This surface can also be tilted in order to tilt the light output to an off-axis angle.

Figure 11:
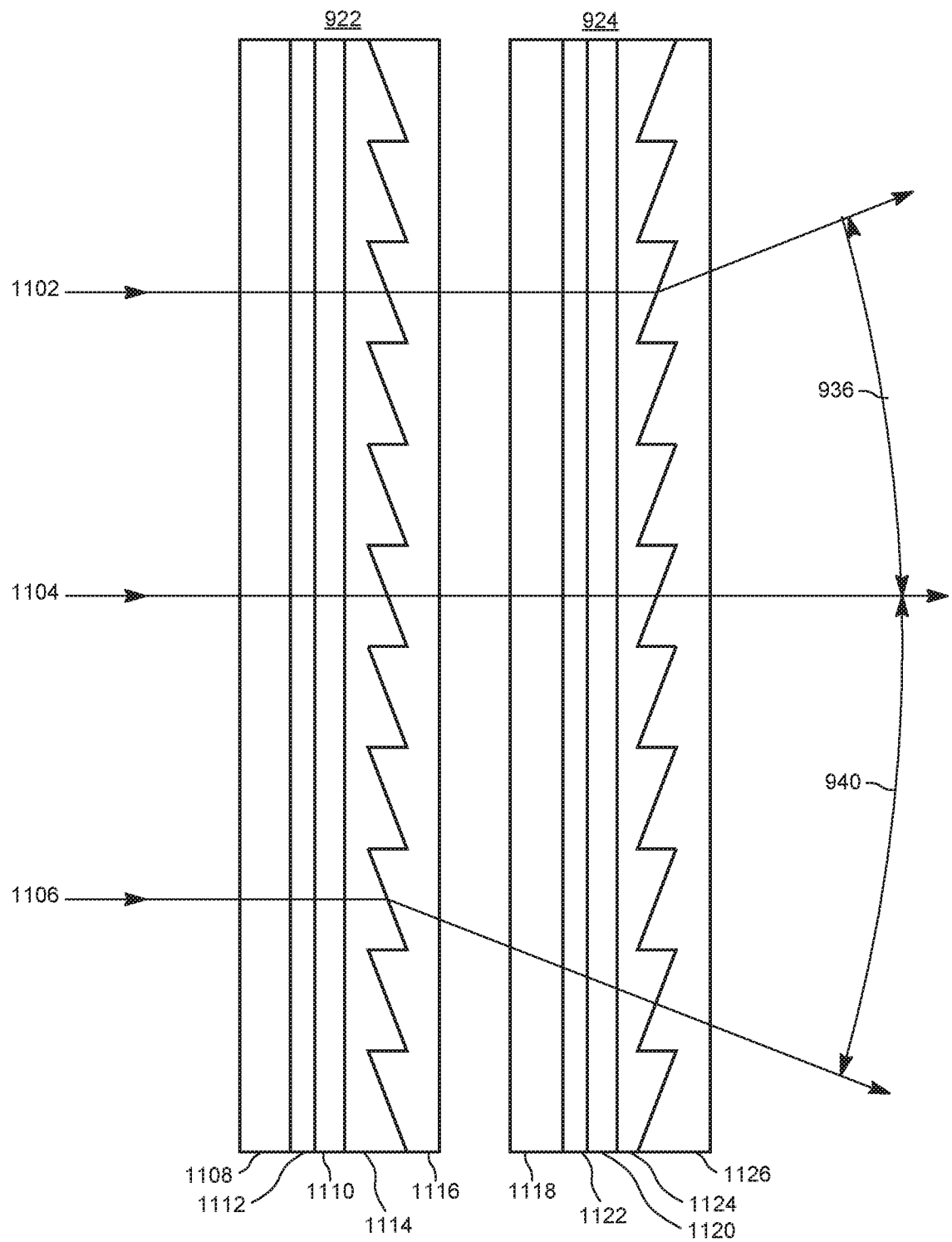
FIG. 11 is a representation of an example light-steering layer structure, in accordance with some embodiments.

FIG. 11 is a representation of an example light-steering layer structure 922, 924 of the light generation module 900 of an LF display 200, in accordance with some embodiments. In the example, two light-steering layers 922, 924 bend beam paths in two different directions at two different angles 936, 938. One beam steering layer may be used to switch, for example, between two angles, but two cascaded layers may generate at least three different steering states. As an example, FIG. 11 shows three different ray paths 1102, 1104, and 1106. For the first path 1102, the first beam steering layer 922 is made transparent to the light ray, while the second layer 924 tilts the propagation direction by an angle 936. For the second path 1106, the first element tilts the propagation direction by an angle 940. The middle ray path 1104, experiences no directional changes because both steering layers are made transparent, for example, by suitable twisting of the linear polarization directions in both active LC layers. A combination of the tilting directions is also possible with suitable LC layer arrangements. In some embodiments, more than two elements are stacked in order to produce a greater number of discrete steering angles.

Each light-steering layer 922, 924 shown in FIG. 11 has two thin glass substrate layers 1108, 1118, 1110, 1120, that act as support material for the first LC layer 1112, 1122. This active LC layer 1112, 1122 may act as a polarization modulator. The light-steering layers 922, 924 may be controllable, for example, by applying voltages to the electrodes of one or more of the light-steering layers 922, 924. The electrodes may be advantageously be transparent, for example, comprising indium tin oxide. Each projector cell 946 may be associated with a different section of one or more of the light-steering layers 922, 924. Each section of the one or more of the light-steering layers 922, 924 may be separately controlled or controllable. When voltage is applied to the transparent electrodes patterned on the glass substrates 1108, 1118, 1110, 1120, the LC layer may become transparent to linearly polarized light such that transmitted beams remain unchanged. When no voltage is applied to the first LC layer 1112, 1122, it acts as a polarization rotator by rotating the polarization direction by 90° normal to the propagation direction. As shown in FIG. 11, a second, passive LC layer 1114, 1124 is sandwiched between the second glass substrate 1110, 11120 and a microprism, such as a polymer microprism layer 1116, 1126, respectively. As highly birefringent material, an active LC layer 1112, 1122 has two different refractive indices, one for each of the two linear polarization rotation states, whereas the microprism 1116, 1126 has only one refractive index in both linear polarization rotation states. The passive LC layer 1114, 1124 may be tuned to the same refractive index as the microprisms 1116, 1126 in one direction, for example 1.49 at 550 nm wavelength for a polymethyl methacrylate (PMMA) polymer layer. When voltage is applied to the transparent electrodes, the interface between the second LC layer 1114, 1124 and the microprism 1116, 1126 has no refractive index difference and is optically transparent to an incoming beam with the appropriate polarization direction. When the voltage is not applied, the polarization direction is rotated in the first LC layer 1112, 1122 by 90°, and the difference in the indices between the LC layer 1112, 1122 and the microprism 1116, 1126 refracts the beam to a fixed steering angle determined by the amount of refractive index difference and the prism angle. In the example shown, the shape of the border between the second LC layer 1114, 1124 and the microprism 1116, 1126 in the two light-steering layers 922 and 924 appears to be different, although the light-steering layers 922, 924 may be effectively identical, for example, with very few differences, such as manufacturing variances. A first light steering layer may be configured to deflect light in a first plane, and a second light steering layer may be configured to deflect light in a second plane substantially perpendicular to the first plane. Substantially perpendicular includes, for example, 90±0.01 degrees, 90±0.1 degrees, 90±0.5 degrees, 90±1 degree, 90±2 degrees, 90±5 degrees, and so forth. Alternatively, the first light steering layer and the second light steering layer may each be configured to deflect light in one plane. The two light-steering layers 922, 924 may be constructed in the same way with the same shapes, sizes, and materials for each layer, but one layer 924 is rotated, for example, 90 degrees, 180 degrees, or some other angle, with respect to the other layer 924 and aligned for a desired optical effect. In some embodiments, one steering layer 922, 924 is arranged horizontally, and the other steering layer 924, 922 is arranged vertically, e.g., two substantially identical layers 922, 924 rotated 90 degrees with respect to each other, to facilitate control of the direction of light from the light-emitting layer 902 toward any part of the periodic optical layer 926. The one or more light-steering layers 922, 924 switch between directing light from one or more light-emitting elements of the light-emitting layer 902 through one periodic optical feature of the periodic layer 926 and directing light from one or more light-emitting elements through another periodic optical feature of the periodic layer 926. The one or more steering layers 922, 924 may be switched between directing light from one or more light-emitting elements of the light-emitting layer 902 through three or more different periodic optical features of the periodic layer 926. Either or both of the light-steering layers 922, 924 may thus be switchable between directing light from the light-emitting layer 902 through one periodic feature and through any other periodic optical feature of the periodic layer 926.

Figure 12A:
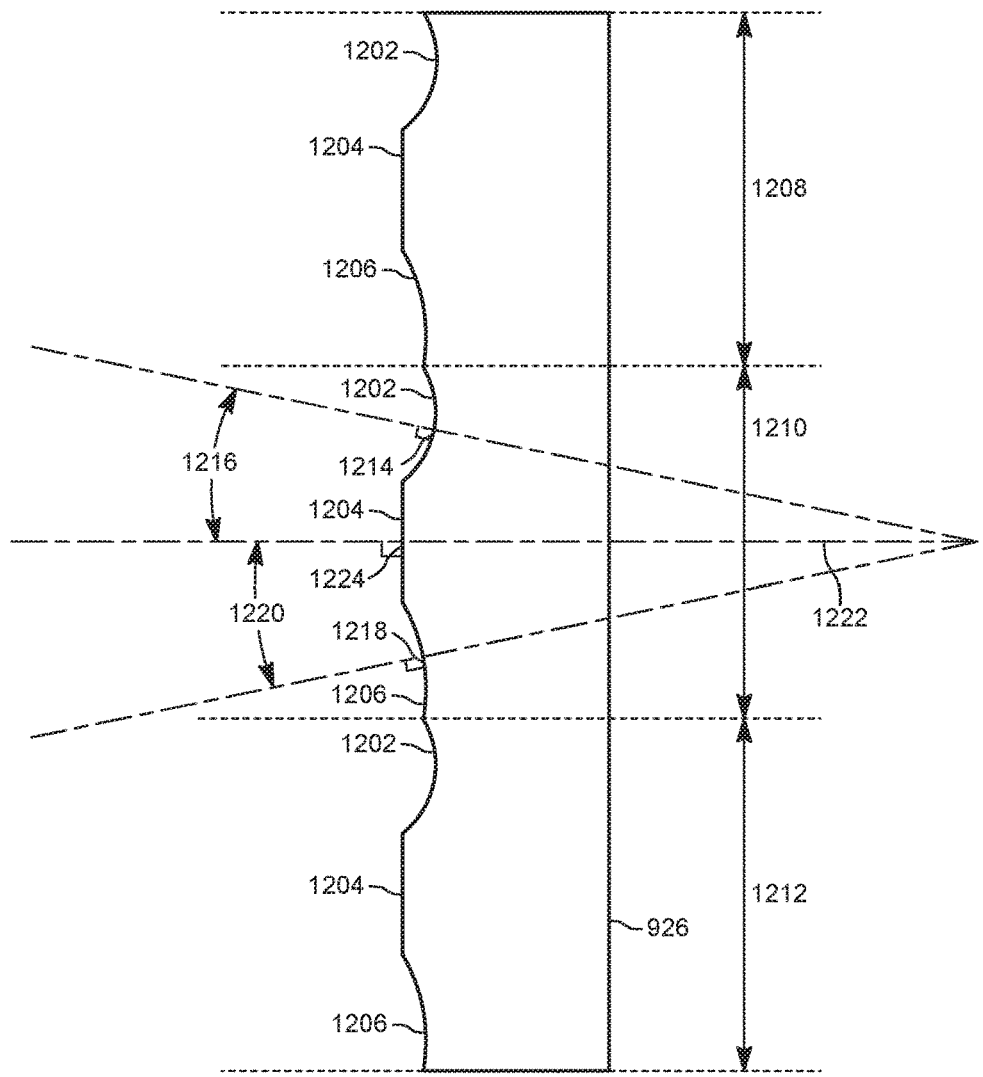
FIG. 12A is a first side view of a first periodic layer structure wherein the repeating periodic feature has three different zones with different optical properties, in accordance with some embodiments.
Figure 12B:
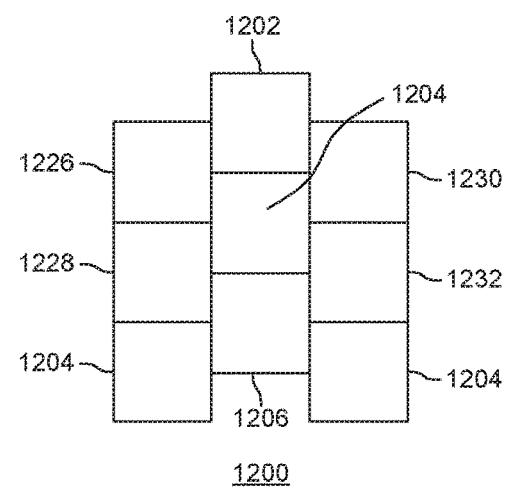
FIG. 12B depicts a second periodic layer structure wherein a single periodic feature has a repeating pattern with nine zones, in accordance with some embodiments.

FIG. 12A and FIG. 12B illustrate examples of repeating optical regions of periodic optical features of the periodic optical layer 926 in accordance with some embodiments. One surface of the periodic layer 926 includes two or more repeating or periodic features 1202, 1204, 1206, each of which may be configured to have different optical characteristics or properties depending on refractive index, surface shape, optical power, and/or surface property. Surface shapes used in some embodiments include, for example, flat facets, continuous curved surfaces with different curvature in two directions, and/or diffusing rectangles with optically rough surfaces, among other possible surface shapes. In the example of FIG. 12A, the periodic layer 926 is divided into multiple optical regions 1208, 1210, 1212, and each optical region includes the same set of periodic features 1202, 1204, 1206. Alternatively, the optical regions may include different sets, different patterns, and/or different arrangements of periodic features 1202, 1204, 1206. The periodic layer 926 may include a repeating pattern of optical regions 1208, 1210, 1212 within which each of the periodic features 1202, 1204, 1206 may be arranged in the same orientation with respect to one another. The optical regions 1208, 1210, 1212 may include different surface areas with different patterns of the periodic features 1202, 1204, 1206. Alternatively, fewer or additional periodic features may be included in one or more repeating optical regions of the periodic layer 926. The scale or size of the periodic features 1202, 1204, 1206 and the regions 1208, 1210, 1212 may be chosen in accordance with the overall optical structure. For example, the optical regions may be smaller than the light-converging lenses. Because the effective focal length for each periodic feature within an optical region may be selected individually, the geometric magnification ratio may also be selected to achieve smaller source image spots and better resolution. Neighboring light emitters inside one source array or matrix may be imaged into an array or matrix of spots. The use of repeating patterns of periodic features over a larger display surface area may lower the cost for manufacturing the components. For example, a single master tool with fine optical features may be produced and copied to a larger stamping or molding tool for large volume production.

FIG. 12A depicts a first side view of an example periodic layer 926, such as shown in FIG. 9. Three repeating periodic features 1202, 1204, 1206, each having different optical properties, are each disposed in three different optical regions 1208, 1210, 1212, in accordance with some embodiments. The optical properties of the periodic features may differ based on the refractive index of their material, the surface shape of the periodic feature, the optical power, and/or a surface property. By tilting a focused beam appropriately at one or more of the light-steering layers 922, 924, a particular periodic feature 1202 inside one optical region 1208 may be selected. This non-mechanical switching technique may be used to select the display beam's properties from a finite set of options determined by the optical properties of the periodic features within the optical regions. In the example of FIG. 12A, the first periodic feature 1202 may have an optical surface with a first radius of curvature 1214 and a surface of the feature 1202 may be tilted at a first tilting angle 1216 with respect to the optical axis. This surface curvature 1214 may modify the focus distance of incoming beams. Features with different curvatures may be used to focus the voxel-forming beams to different distances from the display 200 surface. For example, a first periodic feature may be operative to focus light from a first light-emitting element at first distance from the periodic optical layer 926, and a second periodic feature may be operative to focus light from a the first light-emitting element at second distance from the periodic optical layer. The second distance is advantageously different from the first distance. Different periodic optical features may have different tilt angles or different tilt directions that facilitate different focus characteristics. Beams steered to the same periodic feature 1202 in different optical regions 1208, 1210, 1212 may be effectively co-axial after or beyond the periodic layer 926 by selective use of the tilt of light. In a similar manner, a second periodic feature 1206 may be configured to have a second radius of curvature 1218 and a second tilting angle 1220. When the first radius of curvature 1214 and the second radius of curvature 1218 are different, the optical properties for the LF display 200 differ. Similarly, when the tilting angles 1216, 1220 are different, the optical properties for the LF display 200 differ. Some of the periodic features 1204, may be configured to have a very large (or infinite) radius of curvature 1224 R3 that is optically flat and does not affect the focus of the transmitted beam or light.

FIG. 12B depicts another example of a periodic optical layer, wherein a single zone 1200 has a pattern of nine periodic features 1202, 1204, 1206, 1226, 1228, 1230, 1232. In this example, six of the periodic features 1202, 1206, 1226, 1228, 1230, 1232 are used for focusing and tilting the beams in x and y directions and to different focal depths. These periodic features 1202, 1206, 1226, 1228, 1230, 1232 have smooth and curved surfaces that do not scatter light. Each of the periodic features 1202, 1206, 1226, 1228, 1230, 1232 may have the same optical properties, each may have different optical properties, or any combination of two or more optical properties. The other three periodic features 1204 are identical in this example and may be used to form the voxels directly on top of the display surface or to create 2D display images with higher pixel resolution. These periodic features 1204 may scatter incident light in order to make pixels visible from all viewing directions. For example, these periodic features 1204 may have a rough surface that scatters light.

Periodic features may be arranged in different arrays or patterns on the periodic layer 926. For example, in some embodiments, the periodic features form a rectangular matrix, wherein the rows and columns are aligned horizontally and vertically in a rectangular grid with no offset between adjacent rows or columns. This pattern may facilitate easier rendering calculations when the generated voxels are also arranged in a rectangular matrix or grid. Another example array pattern implemented in some embodiments may have an arrangement with a vertical offset between neighboring or adjacent columns, such as in the pattern shown in FIG. 12B. This pattern may increase the effective resolution, for example, where only horizontal crossing beams are generated. Alternatively, another example array pattern implemented in some embodiments may have an arrangement with a horizontal offset between neighboring or adjacent rows (not shown). In some embodiments, the pattern of periodic feature arrangement and/or periodic feature properties may differ across the display area. Overlapping display pixel FOV issues may be resolved, for example, by tilting the beams from the display's edge towards a central viewing zone by utilizing different periodic features in different optical regions across the display area.

In some embodiments, the periodic optical layer 926 may be a polycarbonate sheet with optical shapes made from UV-curable material in a roll-to-roll process. In some embodiments, the periodic layer 926 may be a layer such as a foil or thin sheet with embossed diffractive structures. In some embodiments, the periodic layer 926 may be a sheet with graded index lens features or a holographic grating manufactured by exposing photoresist material to a laser-generated interference pattern. Individual sub-feature sizes and pattern fill-factors may influence the achievable resolution and/or the amount of image contrast, for example, by reducing stray light introduced to the system. When beams are directed to specific periodic features, aligning the light-emitting layer 902 with the periodic layer 926 with sufficient accuracy in the horizontal and vertical directions is advantageous. The light-steering layers 922, 924 do not have any characteristics that make accurate alignment critical. The light-steering layers 922, 924 may be used for display calibration by fine-tuning the tilt angles with an applied voltage, thereby mitigating at least some of the possible alignment tolerance issues.

3D LF Display Properties

In some embodiments, an LF display system uses a combination of spatial and temporal multiplexing. When the light-steering component is fast enough to reach an adequate refresh rate, a flicker-free image results. The light-emitting layer 902 and light-steering layers 922, 924 operate together to form an image. Accordingly, synchronizing the light-emitting layer 902 and light-steering layers 922, 924 may be advantageous. The display 200 generates signals to control illumination of an addressable array of light-emitting elements of the light-emitting layer 902 and to control steering properties of at least one of the light-steering layers 922, 924 in a time synchronized manner in some embodiments. For example, the light-steering layer may select the focal plane where the projected beams are focused. Because the periodic layer 926 has fixed periodic optical features, this synchronization may be implemented in some embodiments by utilizing a look-up table that connects the light-steering layer control parameters to the individual beam focal depths and angles of the periodic features. Such a table may simplify the controls for image rendering, because the parameters are predetermined for each display. In some embodiments, light-emitting components may be activated individually or in groups that, for example, form a voxel at a specific point in space. In some embodiments, a group of emitters may form one half of a series of neighboring voxels for an individual eye of a single viewer and a different group of emitters may form the other half of the voxels for the other eye. The control parameters may optionally be calibrated for individual displays by performing measurements that connect, for example, a single emitter activation and a beam steering voltage to a specific measured beam focus depth and angular direction values. Faster refresh rates of light-emitting components such as μLEDs may be used advantageously. For example, the light sources may be activated several times within the refresh rate of the beam steering component. In some embodiments, eye tracking may be used to lower the requirements for the refresh rate or update speed. For example, images may be rendered to a subset of specified eye-box regions instead of to the whole display FOV.

Figure 13:
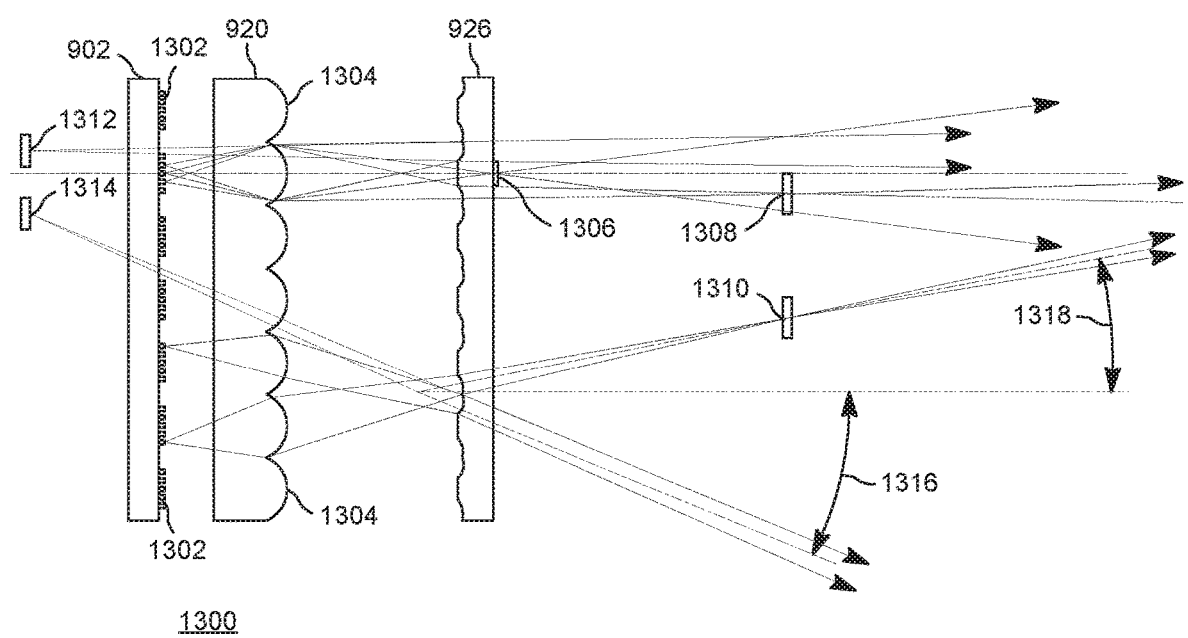
FIG. 13 illustrates the spatial multiplexing function of an LF display, in accordance with some embodiments.

FIG. 13 illustrates the spatial multiplexing function of an LF display 200, in accordance with some embodiments. In the example, an array or matrix of light emitters 1302, also referred to as an addressable array of light-emitting elements, behind each focusing lens 1304 generates a group of beams that are focused close to the periodic features of the periodic layer 926. The features alter the focus distance and propagation angle of each beam, and the individual sources are imaged, for example, at one or more focal points 1306 on the display 200, at one or more focal points 1308, 1310 in front of the display 200, and/or at one or more focal points 1312, 1314 behind the display 200. The resulting source images are larger than the sources, and the optical magnification ratio is determined, for example, by the combination of focusing lens 1304 and periodic feature focal lengths. The pitch or angle of the focusing element may be configured to be the same as the periodic feature pitch or angle in order to address individual periodic features of the periodic layer 926 without use of light-steering layers. Light sources or light-emitting elements 1302 may be arranged into clusters or groups that may have sub-groups of components that are imaged to one periodic feature at a time. With proper arrangement, the neighboring sources or sub-groups 1302 create beams that exit the structure 926 in the same direction but have different focus distances. An example of this function is shown in FIG. 13 with the beams that have different focal points 1306, 1308, 1312. Light sources 1302 or source sub-groups at the edge of the display may also create beams that strike neighboring periodic layer features, in which case the beams exit the display 200 at steeper angles, thereby increasing the projected image FOV. Examples of this effect are illustrated by the beams having focal points 1314, 1310 projected at associated view angles 1316, 1318, respectively.

In some embodiments, a light field display 1300 may operate without any light-steering layer, such as presented in FIG. 13. In such embodiments, only spatial multiplexing is used to generate the multiple crossing beams and focal layers necessary for a 3D image. Accordingly, a trade-off may be found between the number of pixels used for each focal layer and each view direction, because individual emitters may each provide only single beams that propagate in a single direction and have a single focus point. For example, the projected image of the light source positioned in the middle of the source matrix may have one focus point 1306, and the projected image of the light source next to a central light source may have another focus point 1308. Light-steering layers may increase picture quality by adding temporal multiplexing to the system. Light-steering layers may provide the ability to change the distance at which image layers are projected without compromising spatial resolution. This effect may help provide higher resolution images or lower cost structures that have fewer light-emitting components 1302.

Figure 14:
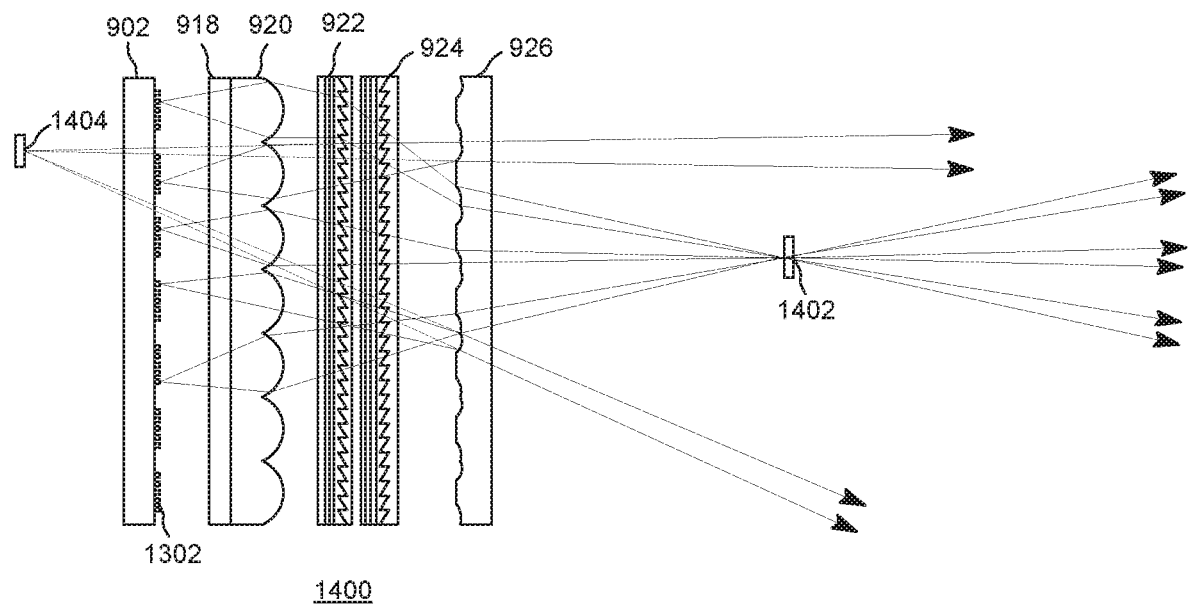
FIG. 14 depicts a display using crossing beams to form voxels, in accordance with some embodiments.

In some embodiments, the optical system of a display 1400 may use crossing beams to form voxels, such as shown in FIG. 14. The voxels may be formed at different distances both in front of and behind the display as well as on the display surface. In the example of FIG. 14, an example voxel 1402 is depicted. This voxel 1402 is created in front of the display 1400 at a specific focal distance using three beams originating from three different sources 1302. Two of these beams (bottom and middle) are created without beam steering, but the third beam (top) is directed and focused at the voxel location by the light-steering layers 922, 924 and temporal multiplexing. Another voxel 1404 is displayed behind the display 1400 by crossing the virtual extensions of two beam sections emitted from two different sources. Single beams with specific focus distances are used to generate correct eye retinal focus cues, whereas multiple beams crossing at the voxel positions are used to cover the larger FOV of the viewer eye pair. This configuration may provide the visual system with the correct eye convergence. In this manner, the generation of small light emission angles for single eye retinal focus cues and larger emission angles for eye convergence, for example, to create a stereoscopic effect, are separated from each other in the optical structure. The arrangement may provide the ability to control the two angular domains separately with the display's optical characteristics or properties. Focal surface distances may be coded and stored in the optical hardware as the optical powers of the periodic features, which may fix the voxel depth co-ordinates at discrete positions. The rendering task may be relatively simplified because the single eye retinal focus cues are created with single emitter beams. For example, one voxel may be formed using only two beams from two emitters. Some embodiments may use more beams to create each voxel, for example, when wider eye-boxes or viewing zones are desired.

One factor that may be considered in the design of 3D LF displays is that optical materials refract light with different wavelengths at different angles (color dispersion). If three colored pixels, such as red, green, and blue sub-pixels, are used, the different colored beams are tilted and focused in somewhat different directions and at somewhat different distances from the refractive features. In some embodiments, color dispersion may be compensated for in the display by using a hybrid layer where, for example, diffractive features are used for color correction. Because colored sub-pixels may be spatially separated on the light-emitting layer, some small angular differences between the colored beam projection angles may result. If the projected images of the source components are kept small enough on the focal surface layers, the three-colored pixels will be imaged next to each other and combined into full-color voxels by the eye in a similar manner analogous to how 2D screens render images where the colored sub-pixels are spatially separated. The colored sub-pixel images of the 3D display are highly directional, and ensuring that all three differently colored beams enter the eye through the pupil is advantageous. For example, implementing the light concentrator and color mixing structures described herein may be advantageous.

Diffraction may also affect the achievable resolution, for example, when the light emitter and focusing lens aperture sizes are very small. The depth range achievable with the light field display and real LF rendering scheme may be affected by the quality of beam collimation or convergence coming from each sub-pixel. Parameters that may determine collimation or convergence quality include the sizes of the light-emitting sources, the size of the periodic layer zone aperture, and the effective focal length. A continuous light emitter matrix on the light-emitting layer may facilitate very wide FOVs. An increase in the difficulty of addressing all periodic layer features accurately when the beams are projected to larger angles may, however, limit the achievable FOV. Some fine-tuning of beam positions at the light-steering layers to larger angles may mitigate the problem of reduced FOV. In some embodiments, other beam steering components such as electrowetting microprisms may be implemented, for example, to better control the beam steering angles.

3D LF Display Rendering Schemes

Several different kinds of rendering schemes may be used together with the display structures and optical methods described herein. Depending on the selected rendering scheme, a display device may be a 3D light field display with multiple views and focal surfaces or a regular 2D display. 2D functionality may be supported by making some of the periodic features optically diffuse, whereby the single beams are visible in a large FOV.

In some embodiments, a 3D LF rendering scheme generates several focal points or focal surfaces in front of or behind the physical display surface in addition to the multiple viewing directions. Generating at least two projected beams for each 3D object point or voxel is advantageous. Reasons for using at least two beams may include (i) that a single emitter inside the display should have an FOV that makes it visible to only one eye at any given time, and (ii) that the created voxel should have an FOV that covers both eyes simultaneously to create the stereoscopic view. The voxel FOV may be generated as a sum of individual beam FOVs when more than one beam is used at the same time. For all voxels that are displayed between the display and the observer, crossing the convergence beams in front of the display at the correct voxel distance may be advantageous. For the voxels positioned at a further distance from the observer than the display, crossing a beam pair virtually behind the display may be advantageous. The crossing of at least two beams generates a focal point or surface that is not only on the display surface. Focusing the separate beams at the same point where they cross may be advantageous. More natural retinal focus cues may be created by generating a single beam focused at periodic features in the periodic layer 926.

Rendering a truly continuous range of depths with a 3D LF display may involve heavy computation. In some embodiments, the 3D data may be reduced to a fixed number of discrete depth layers to reduce computational requirements. In some embodiments, discrete depth layers may be arranged close enough to each other to provide the observer's visual system with a continuous 3D depth experience. Covering the visual range from 50 cm to infinity may take about 27 different depth layers, based on the estimated human visual system average depth resolution. In some embodiments, the methods and optical hardware described herein facilitate creation of multiple focal surfaces that may be displayed at the same time, or inside the visual system persistence-of-vision POV timeframe due to spatially separated features that are used for the depth layer selection. In some embodiments, observer positions may be actively detected by the LF display and voxels may be rendered in only those directions where the observers are located. In some embodiments, active observer eye tracking is used to detect observer positions, for example, using near-infrared (NIR) light with cameras around or in the display structure.

One trade-off associated with the rendering scheme may be found between spatial/angular and depth resolutions. Given a limited number of pixels and component switching speeds, emphasizing high spatial/angular resolution may result in fewer focal planes or lower depth resolution. Conversely, having more focal planes for better depth resolution may result in a more pixelated image or low spatial/angular resolution. The same tradeoff may apply to data processing at the system level, because more focal planes may involve more calculations and higher data transfer speeds. In the human visual system, depth resolution decreases logarithmically with distance, which may facilitate reduction of depth information when objects are farther away. The eyes can resolve only larger details as the image plane goes farther away, which may facilitate the reduction of resolution at far distances. In some embodiments, rendering schemes are optimized by producing different voxel resolutions at different distances from the viewer to lower the processing requirements for image rendering. The tradeoffs connected to the rendering scheme may also be addressed based on the presented image content, enabling, for example, higher resolution or image brightness.

In some embodiments, three differently colored light emitters may be implemented on the light-emitting layer 902 in order to create a full-color picture. The color rendering scheme may involve systems and/or methods to adapt to the different colors that are refracted at somewhat different angular directions at the periodic layer 926. In addition to a special color rendering scheme, some of this dispersion may be removed with hardware, for example, by integrating diffractive structures for color correction, which may compensate for different focus distances of the refractive periodic features. An example color rendering scheme, in accordance with some embodiments, uses white illumination by combining the output of three differently colored components with an optical light mixing structure as described herein, and the beam color may be selected with the light-emitting layer controls.

Implementation Examples

Figure 15:
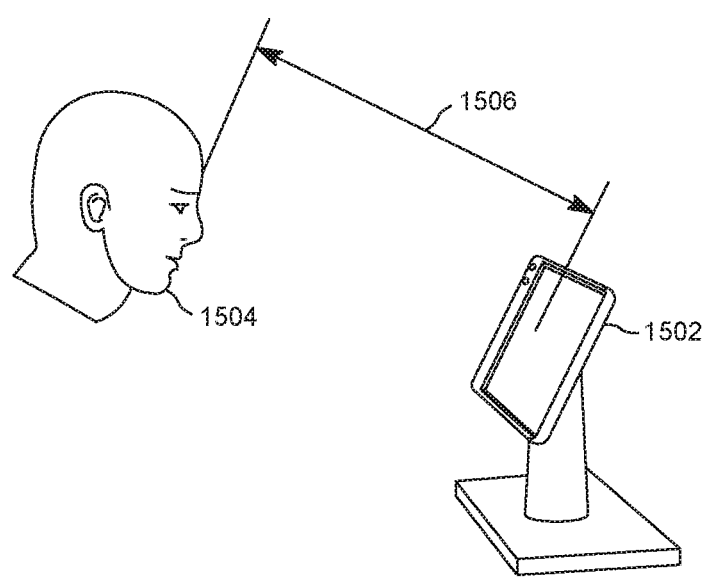
FIG. 15 depicts a curved 3D light field display viewed from a distance, in accordance with some embodiments.

FIG. 15 depicts a curved 3D light field display 1502 device viewed from a particular distance by a viewer 1504, in accordance with some embodiments. In this example, a 14 inch desktop 3D LF display is viewed from a distance 1506 of 500 mm. The display screen is curved with a 500 mm radius such that single display LF pixel emission patterns overlap at the viewer 1504 position. Single LF pixels emit light to approximately 42° FOV in this example. An approximately 380 mm wide viewing window is formed around the viewer eyes to provide adequate head and eye movements for a single user in this example.

Figure 16A:
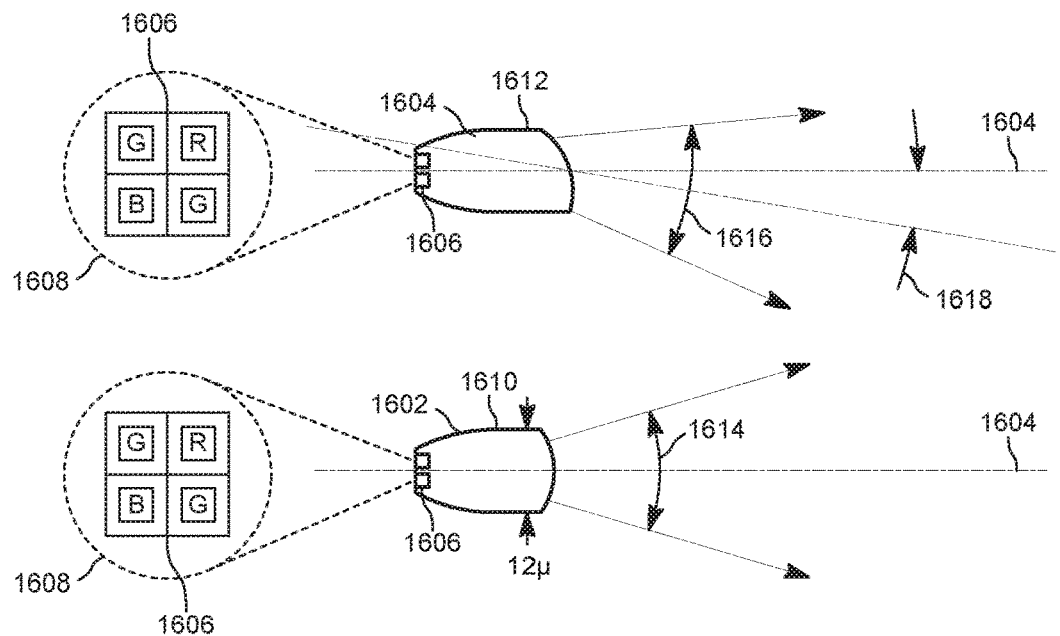
FIG. 16A is a representation of two light concentrators of a light-emitting layer, in accordance with some embodiments.

FIG. 16A is a representation of two light concentrators 1602, 1604 of a light-emitting layer 902, in accordance with some embodiments. A µLED cluster 1606 is implemented as four 2 µm×2 µm µLEDs positioned in a rectangular pattern, such as shown in the side view 1608 (looking into the concentrator from the left side of the drawing), where pitch between the centers of the µLEDs is 3 µm. Each cluster 1606 has one red R, one blue B, and two green G µLEDs as shown in the side view 1608. Sides of only the R and G µLEDs from the right side of the cluster 1606 of the side view 1608 are shown within the concentrators 1602, 1604 in FIG. 16A. The µLED clusters 1606 may be overmolded into a structure including a light concentrator 1602, 1604 and color mixer 1610, 1612, respectively, which structure concentrates the total emission pattern in a 30° cone 1614, 1616, respectively. The exit aperture size of the concentrators 1602, 1604 is 12 µm×12 µm in this example. The front facet of the concentrator is curved in order to reach the Numerical Aperture (NA) that facilitates high energy efficiency in the optical path of the entire display.

Figure 16B:
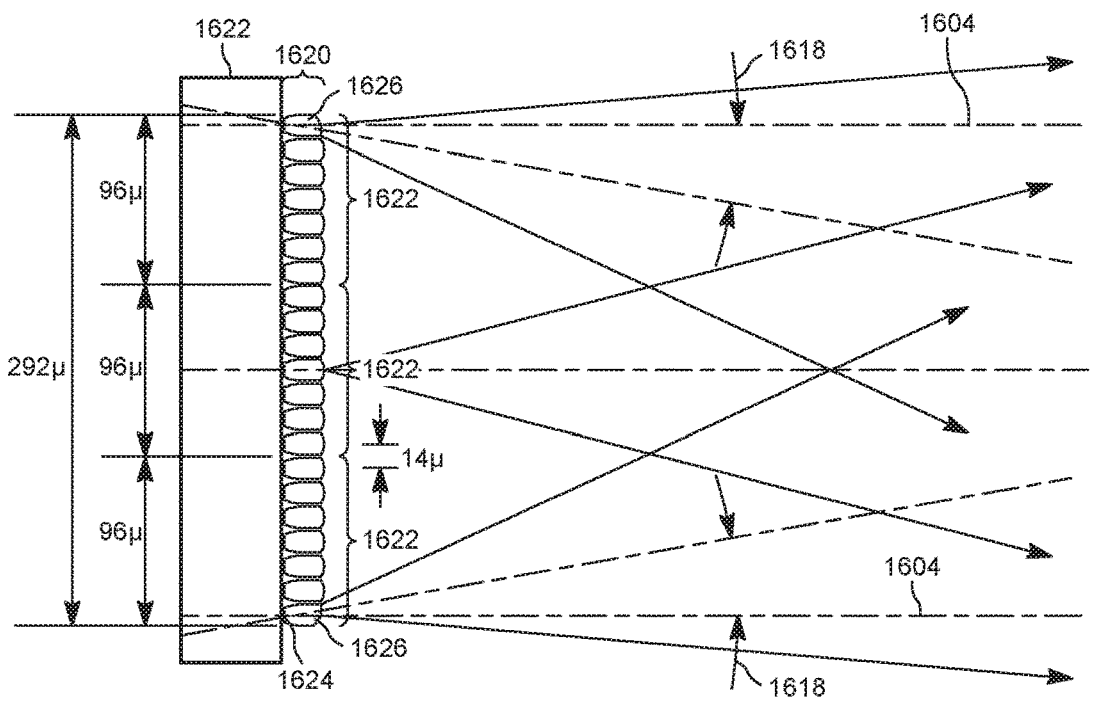
FIG. 16B is a representation of a source matrix of a light-emitting layer, in accordance with some embodiments.

FIG. 16B is a representation of a light source matrix 1600 of a light-emitting layer 902 in accordance with some embodiments. In the example, light-emitting elements in the form of light source clusters with integrated concentrators 1620 are arranged into a 21×21 matrix and bonded to a substrate 1622 thereby forming a sub-assembly. The substrate has electrical contacts 1624 that may individually activate each µLED light source. The electrical contacts 1624 and light clusters 1620 form an addressable array of light-emitting elements. The display generates signals to control illumination of the addressable array of light-emitting elements of the light-emitting layer 902 and to control steering properties of at least one of the light-steering layers 922, 924 in a time synchronized manner. The pitch between adjacent full-color integrated sources is 14 µm, making the total width of the matrix 292 µm. The concentrators at the edge of the matrix have tilted front facets that tilt the emission patterns by a 10° tilt angle 1618 towards the optical axis 1604 of the array as shown in FIG. 16A and FIG. 16B. In some embodiments, front facets vary in angle through the matrix in such a way that the emission pattern centerlines meet at an 800 µm distance in front of the matrix in this example. This distance may provide very high optical efficiency and low stray light performance by reducing wasted light to the outside of the light collecting lens aperture that follows. In the example shown in FIG. 16B, the integrated sources are grouped into 7×7 source clusters 1622 that are 96 µm wide.

Figure 17:
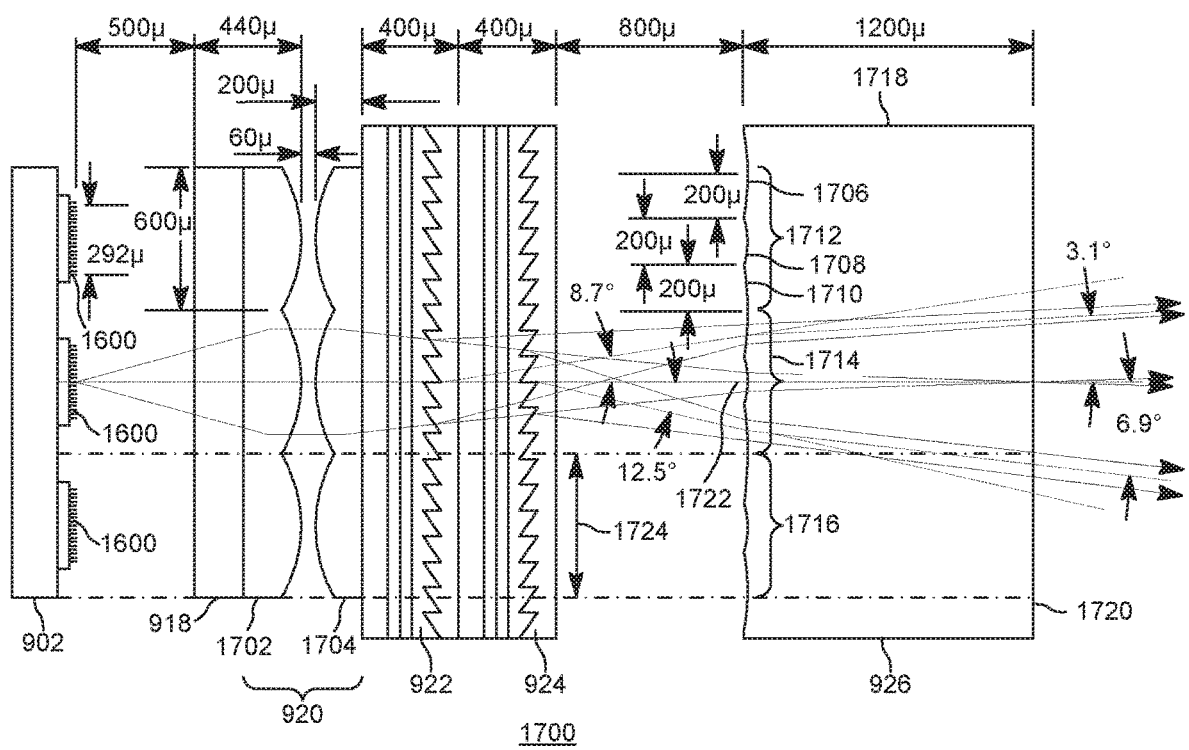
FIG. 17 is a representation of the optical design of a display, in accordance with some embodiments.

FIG. 17 is a representation of the optical design of a display, in accordance with some embodiments. FIG. 17 presents an example design with measurements (in µm) of the display's optical structure, which is approximately 4 mm thick. In the example, light emitted from the source matrix 1600 of the light-emitting layer 902 is collected and focused with two plano-convex microlens arrays 1702, 1704 of the converging lens layer 920, which arrays 1702, 1704, may be manufactured by hot embossing PMMA material. The lens aperture sizes are 600 µm×600 µm in this example. The first lens 1702 has a focal length of 800 µm and collects the emitted light in this example. The second lens 1704 has a focal length of 1670 µm and focuses the light through two light-steering layers 922, 924 to the periodic features 1706, 1708, 1710 of the periodic layer 926 in this example. The periodic features 928, 930, 932 have at least one different optical property from one another, for example, refractive index, light scattering, and a surface property, such as shape or radius of curvature. A 200 µm thick linear polarizer sheet or foil 918 is laminated to the collector microlens 1702 in this example. The second lens 1704 is laminated to a stack that contains two 400 µm thick light-steering layers or components 922, 924 that operate in conjunction with a combination of liquid crystal materials and polymer microprisms as described herein. The light-steering layers 922, 924 may tilt the focused beams by 8.7° in the counterclockwise direction above the optical axis and by 12.5° clockwise in the horizontal plane in this example. These tilt angles may facilitate the steering of the emitter cluster images from one optical region 1712 of the periodic layer 926 to the next optical region 1714 of the periodic layer 926 given the 800 µm distance between the layer stack and the periodic layer 926 in this example.

In the example shown in FIG. 17, the periodic layer 926 is integrated to a 1.2 mm thick display protective window 1718, which is made from injection molded PMMA material. The outer surface 1720 of the protective window 1718 may be the outer surface of the LF display 1700 and thus may be touched by the viewer. The width of each repeating optical region 1712, 1714, 1716 is 600 µm and each optical region 1712, 1714, 1716 contains three 200 µm periodic features 1706, 1708, 1710, each with different optical properties in this example. Each of the optical regions 1712, 1714, 1716 shown in this example have a negative optical power, thus the incoming focused beams diverge. In this example, the first periodic feature 1706 has a focal length of −240 µm and focuses the beams at ~100 mm distance from the display surface 1720 toward the viewer. In this example, the second periodic feature 1708 has a focal length of −340 µm and focuses the beams on the front surface 1720 of the protective window 1718. In this example, the third periodic feature 1710 has a focal length of −230 µm and is to form voxels behind the display at ~200 mm distance by the virtual extensions of the beams. The first and third periodic features 1706, 1710 have optical apertures that are offset from the optical axis 1722 facilitating 5.6° beam tilt. This beam tilting may be used to compensate for the tilt coming from different light source cluster positions off the optical axis 1722. In this example, all three optical regions are able to project beams in the same central direction when the beam tilting elements are not activated, as shown in the example ray trace diagram in FIG. 18. The display 200 is configured to generate signals that control illumination of the addressable array of light-emitting elements and signals that control steering properties of the light-steering layers 922, 924. The signals are synchronized. The signals that control steering properties of the light-steering layers 922, 924 may be, for example, beam steering voltages applied to the light-steering layers 922, 924. The signals may be generated, for example, by a processor 118 executing instructions stored in memory. A periodic feature 928, 930, 932, 1706, 1708, 1710 is selected based on depth information for a three-dimensional image rendered on the display 200. Light emitted by a light-emitting element is steered toward one of the periodic optical features based on depth information of the image being displayed. Light is directed through the steering layers 922, 924 to the selected periodic feature to produce voxels that focus at various distances 934, 938, 942 from a surface of the display 200 to produce a three-dimensional image. Although only three distances are specifically shown, any number of distances may be displayed within a range of distances in front of and behind the display. An example projector cell 1724 in the display 1700 includes a set of corresponding components, for example, a plurality of light-emitting elements 1600, converging lenses of the lens arrays 1702, 1704, a section of the light-steering layers 922, 924, and an optical region 1716 of the periodic layer 926.

Figure 18:
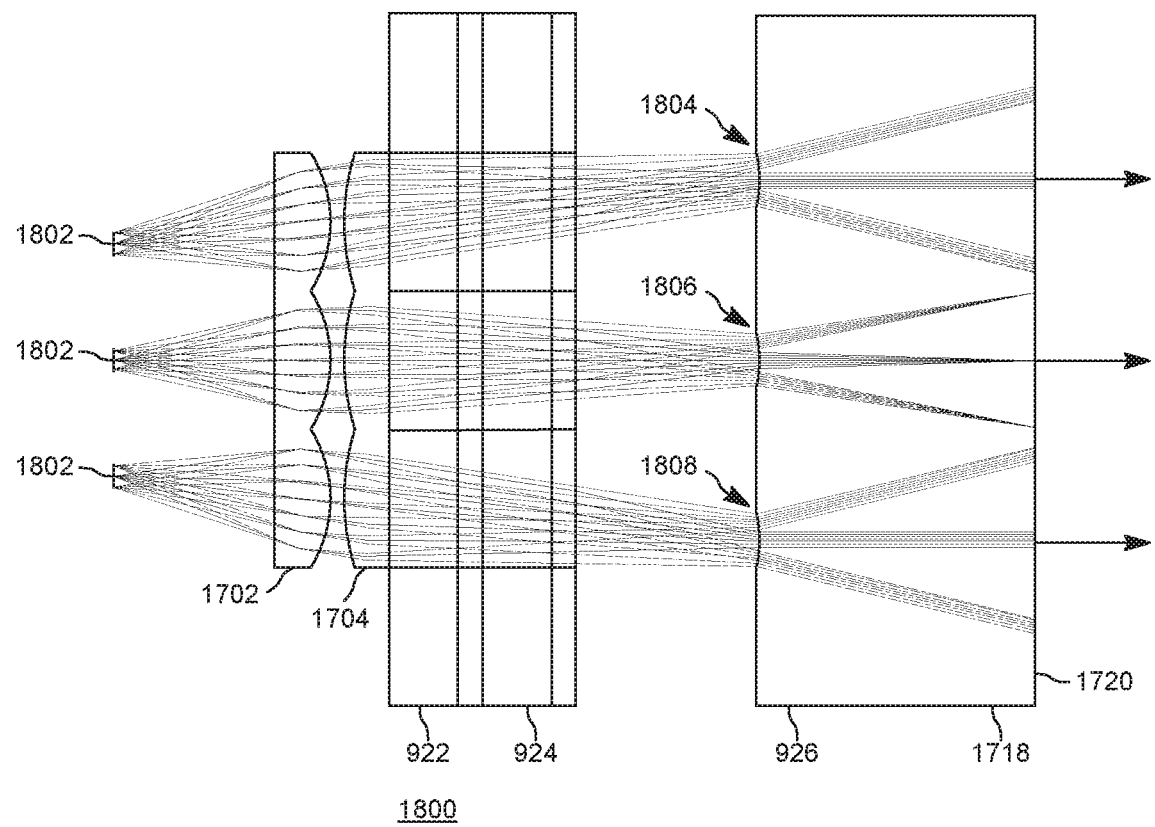
FIG. 18 is an example of an optical ray trace diagram depicting light from three source clusters traversing focusing lenses, light-steering layers, and a periodic layer.

FIG. 18 is an example of an optical ray trace diagram depicting light from three source clusters 1802 traversing focusing lenses 1702, 1704, light-steering layers 922, 924, and a periodic layer 926 with a protective window 1720. In the example, the optical magnification of the light collecting lenses 1702 and focusing lenses 1704 is ~2.1, thus the image of one 7×7 source cluster 1802 is ~200 μm wide. This size image fits inside the area of a periodic feature 1804, 1806, 1808, thus facilitating the projection of such matrix images from all periodic features 1804, 1806, 1808 to different focal planes determined by the optical powers of the periodic features 1804, 1806, 1808. The central periodic feature 1806 focuses this matrix image to the front surface 1720 of the protective window 1718, which surface 1720 is the exit surface of the entire display structure 1800. Total magnification of this optical feature structure is ~6.25 in this example, thus a single full-color emitter is imaged to ~85 μm full-color pixel in this example. A 14-inch display typically has an array of 3840×2160 pixel clusters, resulting in a 4K display.

Also shown in FIG. 18, a single source image beam is projected out of the display 1800 through the central periodic feature 1806 and creates ~70 mm diameter blurred spot at the designated 500 mm viewing distance. In some situations, the eye pupils function as the limiting aperture. Because the spot is so wide, the same light source is visible to both eyes that have approximately 64 mm pupil separation. Thus, the voxel created with central periodic feature 1806 is positioned on the display surface 1720 and should be visible to both eyes at the same time. The single source beams projected through the first periodic feature 1804 and the third periodic feature 1808 create ~55 mm wide spots at the 500 mm viewing distance. The smaller spots result from the beam convergence coming through aspects of the periodic features' 1804, 1808 with different focal lengths, resulting in the system imaging the light sources with less blur to the viewer position or location. The smaller spot is not visible to both eyes at the same time, and two beams crossing outside the display surface 1720 may form voxels without contradicting retinal focus cues. In some embodiments, the light-steering layers 922, 924 facilitate beam crossing only in the horizontal direction, but because the emitter matrices 1802 and microlens arrays 1702, 1704 are two-dimensional, two dimensional beams are generated. Voxel formation may be provided by virtue of the fixed positioning of the display 1800 with respect to horizontally spaced eyes. Voxel resolution may be determined by the size of the eye pupil because this size may be the limiting optical aperture.

Figure 19:
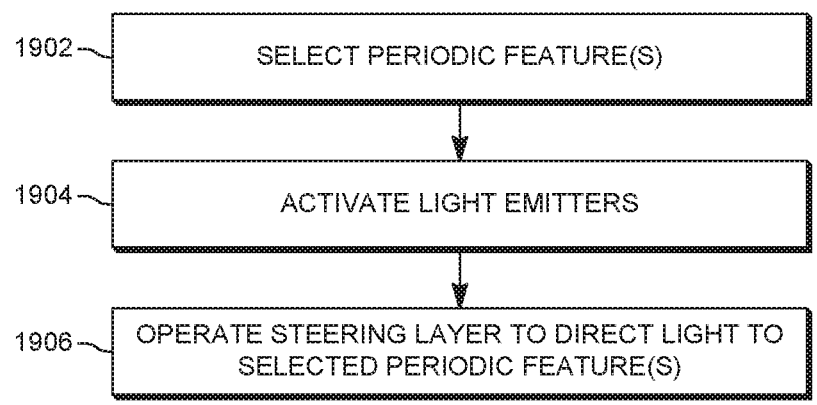
FIG. 19 is a flowchart showing a method of displaying a three-dimensional image in accordance with some embodiments.

A method of displaying a three-dimensional image is shown in the flowchart of FIG. 19. The flowchart may be performed, for example, by software executed by one or more processors of the display 200. The method may include additional or few processes than shown and/or described and may be performed in a different order. Computer-readable code executable by one or more processors to perform the method may be stored in a computer-readable medium, such as a non-transitory computer-readable medium. An image comprising a plurality of voxels is displayed by displaying or projecting a plurality of voxels at a plurality of voxel positions. One or more of the periodic features 928, 930, 932, 1706, 1708, 1710 of the periodic optical layer 926 is selected 1902 based on depth information of a pixel of a three-dimensional image rendered by the display 200 and one or more optical properties of the periodic feature(s) 928, 930, 932, 1706, 1708, 1710. Light emitted by a light-emitting element is steered toward one of the periodic optical features based on depth information of the image being displayed. The display 200 selectively emits light from pixels or light-emitting elements of an addressable array of light-emitting elements 1600 by activating 1904 pixels or light-emitting elements associated with data for the 3D image being rendered. Light emitted from the pixels or light-emitting element of the addressable array of light-emitting elements 1600 of the light-emitting layer 902 is directed toward one or more of the selected periodic features 928, 930, 932, 1706, 1708, 1710 to focus light at various distances from a surface 1720 of the display 200 based on the data for the 3D image being rendered or displayed. Light may be focused at one or more distances in front of, at the surface 1720 of, and at one or more distances behind the surface of the display 200. The emitted light is directed by operating 1906 at least one light-steering layer 922, 924 to direct the emitted light toward one or more selected periodic features 928, 930, 932, 1706, 1708, 1710. The emitted light may be directed in a time-synchronized manner toward the selected periodic features 928, 930, 932, 1706, 1708, 1710. Alternatively, the emitted light may be directed in a time-multiplexed manner toward the selected periodic features 928, 930, 932, 1706, 1708, 1710. Applying a voltage to at least one of the light-steering layers 922, 924 directs light from the emitters toward the periodic layer 926. A first section of the light-steering layer 922, 924 may be operated to selectively direct light from a first light-emitting element toward a first periodic optical feature of the periodic optical layer 926, and the first periodic optical feature focuses the light onto a first voxel position. A second section of the light-steering layer 922, 924 may be operated to selectively direct light from a second light-emitting element toward a second periodic optical feature of the periodic optical layer 926, and the second periodic optical feature focuses the light onto the first voxel position. A third section of the light-steering layer 922, 924 may be operated to selectively direct light from a third light-emitting element toward a third periodic optical feature of the periodic optical layer 926, and the third periodic optical feature focuses the light onto a second voxel position. The first voxel position may have a first depth, and the second voxel position may have a second depth different from the first depth. The light-steering layer(s) 922, 924 may be controlled on a pixel basis. Signals to selectively emit light from the pixels may be generated, for example, individually or by any combination of the display 200, a processor associated with the display, and software storing data for creating the signals. The light passing through the selected periodic features 928, 930, 932, 1706, 1708, 1710 may advantageously produce crossing beams that are used to form voxels, for example, at distances in front of the display 200, at the surface 1720 of the display 200, and at distances behind the display 200. The light exiting the outer surface 1720 of the display 200 may be focused into a set of beams that forms an image in different viewing directions.

Some of the described methods and optical structures are more suitable for large screen sizes because diffraction effects limit the achievable focused beam spot size in smaller displays that call for very small projector cell aperture sizes. Generation of correct retinal focus cues may be lost when diffraction blurs the source image too much. The presented optical features scale together with the display size. Some embodiments may be implemented using large scale manufacturing methods, such as roll-to-roll nanoimprinting.

The non-mechanical light-steering layers used in some embodiments may be produced with materials, such as liquid crystal (LC), and processes that are known in the display industry. Some embodiments may use LC technology that employs linearly polarized light, which lowers optical efficiency of the system and increases power consumption.

A display may operate to produce voxels at multiple focal planes. The voxels may be produced by generating light beams that focus at one or more different distances from the display surface. The display may include a light-emitting layer including a plurality of cells, also known as light-emitting elements, comprised of light sources and light collimating or converging optical structures; a periodic optical layer comprising a repeating pattern of optical regions, wherein each optical region comprises a plurality of spatially arranged periodic features with differing optical refractive and scattering properties; and at least one light-steering layer. The display generates signals to control the illumination of the light-emitting elements and the steering properties of the at least one light-steering layer in a time synchronized manner. The steering properties of the one or more light-steering layers may be optionally controllable at a pixel level. A signal generated to control the steering properties of a steering layer may optionally be generated to cause the steering layer to steer a beam of light generated by an illuminated light-emitting element to a selected periodic feature of the periodic layer, wherein the periodic feature is selected based on depth information of 3D content being rendered by the display. The light-emitting layer may optionally comprise a cluster of light emitters comprising light concentrators having a first geometry and a second geometry, where the light concentrators having the second geometry are disposed along one or more edges of the cluster. The optical properties of the spatially arranged periodic features may optionally differ based on the refractive index of the material, the surface shape of the periodic feature, and/or a surface property. The spatially arranged periodic features may optionally be offset vertically and/or horizontally to increase the effective resolution of the display.

A display comprises an addressable array of light-emitting elements; a periodic optical layer comprising a plurality of repeating regions, wherein two or more of the repeating regions each comprise a first periodic feature having a first optical property and a second periodic feature having a second optical property; at least one light-steering layer disposed between the addressable array of light-emitting elements and the periodic optical layer, wherein the light-steering layer provides selective control over a direction of light reaching the periodic optical layer from the addressable array of light-emitting elements, such that light is focused at various distances from a surface of the display, A beam of light may be steered toward one of the first periodic feature and the second periodic feature based on depth information of a three-dimensional image rendered by the display. A signal generated to control steering properties of the at least one steering layer may cause the steering layer to steer a beam of light generated by the addressable array of light-emitting elements to a selected periodic feature of the periodic optical layer. The selected periodic feature may be selected based on depth information of a three-dimensional image rendered by the display. The first optical property may differ from the second optical property by at least a refractive index, surface shape, optical power, and/or surface property. The display may be configured to generate signals that control illumination of the addressable array of light-emitting elements and signals that control steering properties of the at least one light-steering layer in a time synchronized manner to produce voxels that focus at various distances from the surface of the display. The first periodic feature may focus light at a first distance from a surface of the display and the second periodic feature may focus light at a second distance from the surface of the display. A third periodic feature may focus light in a first direction, and a fourth periodic feature may focus light in a second direction. A first light-steering layer may be arranged substantially perpendicularly to a second light-steering layer. The plurality of repeating regions may be offset vertically or horizontally from each other to increase effective resolution of the display. The addressable array of light-emitting elements may comprise a plurality of light emitters constructed with a plurality of light concentrators having tilted front facets near an edge of the array.

A method comprises selecting a periodic feature from a plurality of periodic features arranged in repeating regions of a periodic optical layer. The periodic feature is selected based on depth information of a voxel of a three-dimensional image rendered by a display and at least one optical property of the periodic feature. The three-dimensional image is rendered by the display by selectively emitting light from an addressable array of light-emitting elements and by operating at least one light-steering layer in a time synchronized manner to direct the emitted light toward one or more selected periodic features to focus light at various distances from a surface of the display. Crossing beams may be used to form the voxels at distances in front of the display and distances behind the display. A first periodic feature of the plurality of periodic features may have a first optical property, and a second periodic feature of the plurality of periodic features may have a second optical property that is different from the first optical property. Operating may comprise applying a voltage to the at least one light-steering layer. Light may be focused as a set of beams that form an image in different viewing directions. Light may be steered toward one of the first periodic feature and the second periodic feature based on depth information of a three-dimensional image rendered by the display. A signal generated to control steering properties of the at least one steering layer may cause the steering layer to steer light generated by the addressable array of light-emitting elements to a selected periodic feature of the periodic optical layer. The selected periodic feature may be selected based on depth information of a three-dimensional image rendered by the display.

Systems and methods are described for producing voxels at multiple focal planes. The voxels are produced by generating light beams that focus at various distances from the display surface. In some embodiments, a display includes a light-emitting layer, a periodic optical layer, and one or more light-steering layer(s). The light-emitting layer includes a plurality of cells, each cell including at least one light-emitting element. The periodic layer may include a repeating pattern of regions, and each region may comprise a plurality of spatially arranged periodic features with differing optical refractive and/or scattering properties. The display controls the illumination of the light-emitting elements and the steering properties of the light-steering layer(s) in a time synchronized manner.

Note that various hardware elements of one or more of the described embodiments are referred to as "modules" that carry out (e.g., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (e.g., hardwired) instructions, firmware instructions, software instructions, and/or the like, and may be stored in any suitable non-transitory computer-readable medium or media, such as commonly referred to as RAM, ROM, and so forth.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. An apparatus for displaying an image by an optical system, comprising:
    a light-emitting layer comprising an addressable array of light-emitting elements including a first light-emitting element;
    a periodic optical layer overlaying the light-emitting layer, the periodic optical layer comprising at least a first periodic optical feature having a first optical power and a second periodic optical feature having a different optical power; and
    a first controllable light-steering layer between the light-emitting layer and the periodic optical layer, wherein the first controllable light-steering layer is switchable between directing light from the first light-emitting element through the first periodic optical feature and directing light from the first light-emitting element through the second periodic optical feature, wherein the directed light through the first periodic optical feature and through the second periodic optical feature is focused on a position of a voxel of the displayed image.

2. The apparatus of claim 1, wherein the first periodic optical feature and the second periodic optical feature are included in a first optical region, and wherein the periodic optical layer comprises a repeating pattern of optical regions arranged similarly to the first optical region.

3. The apparatus of claim 1, further comprising a converging lens layer between the light-emitting layer and the periodic optical layer.

4. The apparatus of claim 3, wherein the converging lens layer comprises a two-dimensional array of converging lenses, and wherein each converging lens is associated with at least one of the light-emitting elements in a projector cell.

5. The apparatus of claim 4, wherein each projector cell includes a corresponding optical region of the periodic optical layer.

6. The apparatus of claim 4, wherein different sections of the first controllable light-steering layer are associated with different projector cells and are separately controllable.

7. The apparatus of claim 1, wherein the first periodic optical feature is operative to focus light from at least the first light-emitting element at a first distance from the periodic optical layer, and the second periodic optical feature is operative to focus light from at least the first light-emitting element at a second distance from the periodic optical layer, wherein the second distance is different from the first distance.

8. The apparatus of claim 1, wherein the first controllable light-steering layer comprises at least one liquid crystal light-steering layer.

9. The apparatus of claim 1, wherein the light-emitting layer further comprises a second light-emitting element;
    wherein the periodic optical layer further comprises a third periodic optical feature having a first tilt direction and a fourth periodic optical feature having a second tilt direction different from the first tilt direction; and
    wherein the first controllable light-steering layer is switchable between directing light from the second light-emitting element through the third periodic optical feature and directing light from the second light-emitting element through the fourth periodic optical feature.

10. The apparatus of claim 1, further comprising a second controllable light-steering layer between the light-emitting layer and the periodic optical layer.

11. The apparatus of claim 10, wherein the first controllable light-steering layer is configured to deflect light in a first plane, and the second controllable light-steering layer is configured to deflect light in a second plane substantially perpendicular to the first plane.

12. The apparatus of claim 10, wherein the first controllable light-steering layer and the second controllable light-steering layer are each configured to deflect light in a first plane.

13. The apparatus of claim 1, wherein at least one of the first periodic optical feature and the second periodic optical feature comprises a rough surface that scatters light.

14. A method for displaying an image by an optical system, comprising:
    displaying an image comprising a plurality of voxels including a first voxel at a first voxel position by:
        selectively emitting a first light by a first light-emitting element of a light-emitting layer, comprising a plurality of light-emitting elements;
        operating a first section of a controllable light-steering layer to selectively direct light toward a first periodic optical feature of a periodic optical layer, comprising a plurality of periodic optical features, wherein the first periodic optical feature has a first optical power and focuses the first light onto the first voxel position;
        selectively emitting a second light by a second light-emitting element of the light-emitting layer; and operating at least a second section of the controllable light-steering layer to selectively direct the second light toward a second periodic optical feature of the periodic optical layer, wherein the second periodic optical feature has a different optical power and focuses the second light onto the first voxel position.

15. The method of claim 14, further comprising, for at least a second voxel in the image having a second voxel position:

selectively emitting third light by at least a third light-emitting element of the light-emitting layer; and operating at least a third section of the controllable light-steering layer to selectively direct light toward a third periodic optical feature of the periodic optical layer, wherein the third periodic optical feature focuses the third light onto the second voxel position.

16. The method of claim 15, wherein the first voxel position has a first depth and the second voxel position has a second depth different from the first depth.

17. The method of claim 14, wherein light emitted by one of the plurality of light-emitting elements is steered toward one of the plurality of periodic optical features based on depth information of the image.

18. The method of claim 14, wherein at least one of the plurality of periodic optical features comprises a rough surface that scatters light.

* * * * *